US012738386B2

(12) United States Patent
Smidts et al.

(10) Patent No.: US 12,738,386 B2
(45) Date of Patent: Sep. 15, 2026

(54) NUCLEAR REACTOR CORE WITH ROTATING FUEL MODULES AND RELATED SYSTEMS

(71) Applicants: Ohio State Innovation Foundation, Columbus, OH (US); Virginia Tech Intellectual Properties, Inc., Blacksburg, VA (US); Jacksonville University, Jacksonville, FL (US); The University of Maryland, College Park, MD (US)

(72) Inventors: Carol Smidts, Columbus, OH (US); Alireza Haghighat, Arlington, VA (US); Tunc Aldemir, Columbus, OH (US); Fatih Aydogan, Jacksonville, FL (US); Marat Khafizov, Columbus, OH (US); John Horack, Columbus, OH (US); Lei Raymond Cao, Columbus, OH (US); Ji-Cheng Zhao, College Park, MD (US); Valerio Mascolino, Arlington, VA (US)

(73) Assignees: Ohio State Innovation Foundation, Columbus, OH (US); Jacksonville University, Blacksburg, VA (US); Virginia Tech Intellectual Properties, Inc, Jacksonville, FL (US); The University of Maryland, College Park, MD (US)

( * ) Notice: Subject to any disclaimer, the term of this patent is extended or adjusted under 35 U.S.C. 154(b) by 283 days.

(21) Appl. No.: 18/557,439

(22) PCT Filed: Apr. 29, 2022

(86) PCT No.: PCT/US2022/027044
§ 371 (c)(1),
(2) Date: Oct. 26, 2023

(87) PCT Pub. No.: WO2022/256102
PCT Pub. Date: Dec. 8, 2022

(65) Prior Publication Data

US 2024/0212871 A1 Jun. 27, 2024

Related U.S. Application Data

(60) Provisional application No. 63/181,676, filed on Apr. 29, 2021.

(51) Int. Cl.
*G21C 7/30* (2006.01)
*G21C 1/30* (2006.01)
(Continued)

(52) U.S. Cl.
CPC ................. *G21C 1/30* (2013.01); *G21C 3/40* (2013.01); *G21C 7/30* (2013.01); *G21C 7/34* (2013.01)

(58) Field of Classification Search
CPC ... G21C 1/12; G21C 1/30; G21C 5/02; G21C 5/16; G21C 7/30; G21C 7/34; G21D 5/02; G21D 7/04
See application file for complete search history.

(56) References Cited

U.S. PATENT DOCUMENTS 3,047,486 A * 7/1962 Hanson .................. G21C 15/00 976/DIG. 135
3,276,914 A * 10/1966 Shoupp .................... G21D 7/04 136/202

(Continued)

FOREIGN PATENT DOCUMENTS

GB 873552 A 7/1961
GB 922498 A * 4/1963 .............. G21C 7/30

(Continued)

OTHER PUBLICATIONS

International Search Report, dated Feb. 15, 2023, received in connection with corresponding International Patent Application No. PCT/US2022/027044.

*Primary Examiner* — Sharon M Davis
(74) *Attorney, Agent, or Firm* — Meunier Carlin & Curfman LLC

(57) ABSTRACT

Nuclear reactor cores and related systems are described herein. An example nuclear reactor core includes a plurality of fuel modules, where each of the plurality of fuel modules includes nuclear fuel; at least one fuel-module actuator mechanically coupled to at least one of the plurality of fuel modules, where the at least one fuel-module actuator is configured to rotate the at least one of the plurality of fuel modules; and at least one neutron source configured to emit neutrons and trigger a fission chain reaction in the at least one of the plurality of fuel modules.

13 Claims, 23 Drawing Sheets

(51) Int. Cl.
*G21C 3/40* (2006.01)
*G21C 7/34* (2006.01)

(56) References Cited

U.S. PATENT DOCUMENTS

| | | | | | |
|---|---|---|---|---|---|
| 3,455,781 | A * | 7/1969 | Leffert | G21D 7/04<br>310/306 |
| 2005/0069075 | A1 * | 3/2005 | D'Auvergne | G21C 1/00<br>376/172 |
| 2009/0323881 | A1 * | 12/2009 | Dauvergne | G21C 1/30<br>376/173 |
| 2012/0195402 | A1 * | 8/2012 | Chahande | G21C 7/103<br>376/412 |

FOREIGN PATENT DOCUMENTS

| | | | |
|---|---|---|---|
| WO | 2011093841 | A2 | 8/2011 |
| WO | 2021071599 | A2 | 4/2021 |

* cited by examiner

| Comparison of Intensity of (α, n) Neutron Sources | | | |
|---|---|---|---|
| Source | Half-life (yr) | $\frac{neutron}{gm - s}$ | $\frac{neutron}{cm^3 - s}$ |
| Am-Be | 432.2 | 8.24E+06 | 1.13E+08 |
| Pu-be | 24114 | 1.24E+05 | 2.46E+06 |
| Ra-Be | 1600 | 1.48E+07 | 8.16E+07 |

FIG. 4

| ID | Metric | Units | State-of-the-Art | Performance to be achieved by the new design |
|---|---|---|---|---|
| 1 | Overnight construction cost[1] | $/$W_e$ | 2-7 | $5,500 (Dependent upon size) |
| 2 | On-site construction time | Months | > 60 | 24 months |
| 3 | Total staffing level (on-site & off-site)[2] | FTE/$GW_e$ | 450-750 | On-site 2/shift-reactor 250/GW |
| 4 | Emergency planning zone (EPZ) | Miles | 10 and 50 | 0.2 miles |
| 5 | Time before human response required for an accident[3] | Days | 3 | 1 year |
| 6 | Onsite backup power | $kW_e$ | > 0 kW | 0 |
| 7a | Ramp rate without steam bypass | power capacity/min | 5% | 5% |
| 7b | Process heat temperature | °C | N/A | 650C |

FIG. 7

Cross Section of Active Reactor Zone (ACZ)

TH Model for the Core

High Temperature Gas Cooled Reactor (HTGR) Direct Gas Turbine Cycle

NUCLEAR REACTOR CORE WITH ROTATING FUEL MODULES AND RELATED SYSTEMS

CROSS-REFERENCE TO RELATED APPLICATIONS

This application is a U.S. National Stage application filed under 35 U.S.C. § 371 of PCT/US2022/027044, filed on Apr. 29, 2022, which claims the benefit of U.S. provisional patent application No. 63/181,676, filed on Apr. 29, 2021, and titled "ROTATING FUEL CORE WITH FUEL STRIPS FOR SMALL MODULAR REACTOR," the disclosure of which is expressly incorporated herein by reference in its entirety.

BACKGROUND

Future space exploration beyond low-earth orbit brings significant engineering and environmental challenges to the forefront. Among these are the ability to provide reliable power at substantive scale for energy-intensive operations such as material processing, transportation, and thermal conditioning. NASA's trajectory towards returning to the Moon will involve significant human and machine presence in locations beyond those surveyed in the late 1960's and 1970's during Apollo.

For the six human landings on the Moon, all of the locations visited were in the hemisphere of the Moon which continually faces the Earth. Furthermore, these locations were all at relatively low lunar latitudes. While scientifically valuable, these six missions essentially comprise a very small sample of the ensemble lunar environment. With a surface area roughly equal to the continent of Africa, the Moon has many more environments left to explore.

The discovery of volatiles at the lunar poles—including up to six billion tons of water ice—opens up the possibility for resource utilization in-situ, including the manufacturing of propellant, oxygen for human consumption. The indigenous presence of water offers the potential for significant savings on the transportation a primary and essential material needed to support and sustain human presence.

However, the presence of water on the Moon is found to be locked up in locations that are perpetually dark. Cratered regions near the lunar poles, and in particular the South Pole Aitken Basin Region, possess geologically depressed areas which do not receive sunlight during any portion of the Moon's path around the Earth. These 'cold traps' have temperatures that can be as low as 20-30 K, and are the reason that volatiles such as water have not boiled off or been lost to the space environment. Adjacent to these locations are 'peaks of eternal light' where the sun is continually shining. Thus the valuable water resources needed to sustain exploration, and the access to power that might help one process these resources, are geographically located in a 'mutually exclusive' arrangement, separated not only in distance, but also in elevation, with significant harsh terrain in-between. Consequently, processing of volatiles found within perpetually-dark crater floors will require not only the basic energy needed to separate the volatiles from regolith, but also significant amounts of heat energy to keep the equipment warm, long-term sustainability to enable minimal energy resupply activities, be impervious to cosmic particle radiation, and serve many different tasks (charging vehicles, powering processing equipment, lights, heat, telemetry, etc.).

Mobility of any surface power supply itself is likely to be quite limited, either due to engineering constraints or terrain limitations. The logistical challenge of 'stringing power cables' from the areas of perpetual light into the floor of permanently shadowed craters is significant, and creates further failure modes, infrastructure maintenance, and reliability issues.

Therefore, there is a need for a self-contained nuclear power source (reactor) which is modularized to fit atop a dedicated small lunar lander, such as those being designed for early robotic missions in the 'second wave' of lunar exploration after Apollo. Implementations of the present disclosure are directed to these and other concerns.

SUMMARY

Nuclear reactor cores and related systems are described herein. An example nuclear reactor core includes a plurality of fuel modules, where each of the plurality of fuel modules includes nuclear fuel; at least one fuel-module actuator mechanically coupled to at least one of the plurality of fuel modules, where the at least one fuel-module actuator is configured to rotate the at least one of the plurality of fuel modules; and at least one neutron source configured to emit neutrons and trigger a fission chain reaction in the at least one of the plurality of fuel modules.

Optionally, the fission chain reaction is in a subcritical condition. In some implementations, the at least one neutron source is further configured to sustain the fission chain reaction in the at least one of the plurality of fuel modules. Optionally, the fission chain reaction is in a critical condition.

In some implementations, the at least one neutron source is positioned inside of the at least one of the plurality of fuel modules, outside of the at least one of the plurality of fuel modules, or at or near a surface of the nuclear reactor core.

Alternatively or additionally, the nuclear reactor core includes at least one source actuator mechanically coupled to the at least one neutron source, where the at least one source actuator is configured to reposition the at least one neutron source.

In some implementations, the at least one neutron source is a plurality of neutron sources. Alternatively or additionally, each of the plurality of neutron sources is configured to emit neutrons and trigger the fission chain reaction in a respective one of the plurality of fuel modules. Optionally, in some implementations, each of the plurality of neutron sources is further configured to sustain the fission chain reaction in a respective one of the plurality of fuel modules. Alternatively or additionally, each of the plurality of source actuators is mechanically coupled to a respective one of the plurality of neutron sources, and where each of the plurality of source actuators is configured to reposition the respective one of the plurality of neutron sources.

In some implementations, the at least one neutron source includes an alpha-neutron (α, n) source. Optionally, the at least one neutron source includes Americium (Am)-beryllium (Be), plutonium (Pu)—Be, or radium (Ra)—Be.

In some implementations, each of each of the plurality of fuel modules has a cylindrical shape.

In some implementations, where the plurality of fuel modules is three fuel modules.

In some implementations, the nuclear fuel is distributed throughout each of each of the plurality of fuel modules. Alternatively or additionally, the nuclear fuel is arranged in one or more strips. Alternatively or additionally, where the nuclear fuel is arranged in one or more rings.

In some implementations, each of the plurality of fuel modules has a three-dimensional shape that defines an axial direction, and the nuclear fuel is arranged in at least one axial slice formed in at least one of the plurality of fuel modules. Alternatively, each of the plurality of fuel modules has a three-dimensional shape that defines a radial direction, and the nuclear fuel is arranged in at least one radial slice formed in at least one of the plurality fuel modules.

In some implementations, the nuclear fuel is high enriched uranium or low enriched uranium.

In some implementations, the nuclear reactor core further includes a vessel, where the plurality of fuel modules are housed in the vessel. Optionally, the at least one neutron source is housed in the vessel. Alternatively or additionally, the at least one fuel-module actuator is optionally housed in the vessel.

In some implementations, the nuclear reactor core further includes a neutron moderator, where the neutron moderator is arranged within the nuclear reactor core. Optionally, the neutron moderator is arranged inside of the at least one of the plurality of fuel modules, outside of the at least one of the plurality of fuel modules, or at or near a surface of the nuclear reactor core. The neutron moderator is configured to reduce the speed of neutrons within the nuclear reactor core. Alternatively or additionally, the neutron moderator is configured to scatter neutrons back towards the nuclear fuel. Optionally, the neutron moderator includes graphite. Optionally, the at least one neutron source is configured to move relative to the neutron moderator.

In some implementations, each of the plurality of fuel modules includes a cooling channel.

An example nuclear reactor system is also described herein. The system includes a nuclear reactor core; and a controller comprising a processor operably coupled to a memory, the memory having computer-executable instructions stored thereon that, when executed by the processor, cause the processor to control the at least one fuel-module actuator and/or the at least one neutron source to control a rate of the fission chain reaction in the at least one of the plurality of fuel modules.

Another nuclear reactor system is also described herein. The system includes: a nuclear reactor core and an energy conversion system thermally coupled to the nuclear reactor core. Optionally, the energy conversion system is configured to convert heat from the fission chain reaction in the at least one of the plurality of fuel modules to electricity.

In some implementations, the energy conversion system is a thermionic energy converter. Optionally, the thermionic energy converter includes: an emitter electrode; a collector electrode; and a load line coupling the emitter and collector electrodes, where the emitter electrode is thermally coupled to the at least one of the plurality of fuel modules. Optionally, the emitter and collector electrodes are disposed in a vacuum chamber comprising a gas vapor.

In some implementations, the system includes a power source configured to store energy for nuclear reactor startup operations.

In some implementations, the system includes a heat exchanger thermally coupled to the nuclear reactor core and/or the energy conversion system, where the heat exchanger is configured to remove heat from the nuclear reactor core and/or the energy conversion system. Optionally, the heat exchanger is configured to circulate a fluid.

A modular system is also described herein. The system includes a plurality of nuclear reactor cores comprising a first nuclear reactor core and a second nuclear reactor core. Optionally, the system includes an energy conversion system thermally coupled to the plurality of nuclear reactor cores. Optionally, the energy conversion system is a thermionic energy converter. Alternatively or additionally, the system further includes a heat exchanger thermally coupled to the plurality of nuclear reactor cores and/or the energy conversion system, where the heat exchanger is configured to remove heat from the plurality of nuclear reactor cores and/or the energy conversion system.

An example fuel module is also described herein. The fuel module includes a cylinder with two flat end surfaces and a curvilinear surface extending between the two flat end surfaces; nuclear fuel arranged in at least one fuel channel formed on the curvilinear surface of the cylinder; and at least one coolant channel extending between the two flat end surfaces of the cylinder.

In some implementations, the nuclear fuel includes high enriched uranium or low enriched uranium. Optionally, where the at least one fuel channel is helically shaped.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 4 illustrates a table of the intensities of different alpha neutron sources that can be used in implementations of the present disclosure.

FIG. 7 illustrates a table of performance characteristics according to an example implementation of the present disclosure.

FIG. 14A illustrates a design without an outer source drum, and FIG. 14B illustrates a design including an outer source drum. FIG. 14C illustrates an x-y radial projection of another example implementation; FIG. 14D illustrates an x-y axial projection at y=53.1 cm, and FIG. 14E illustrates an x-z axial projection at y=−26.6 cm.

FIG. 15A illustrates a plot of the relationship between $k_{eff}$ and fuel drum diameter for an example implementation of the present disclosure; FIG. 15B illustrates a plot of the behavior of $k_{eff}$ as a function of fuel core height for an implementation of the present disclosure.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. As used herein, the terms "about" or "approximately" when referring to a measurable value such as an amount, a percentage, and the like, is meant to encompass variations of ±20%, ±10%, ±5%, or ±1% from the measurable value.

Figure 1:
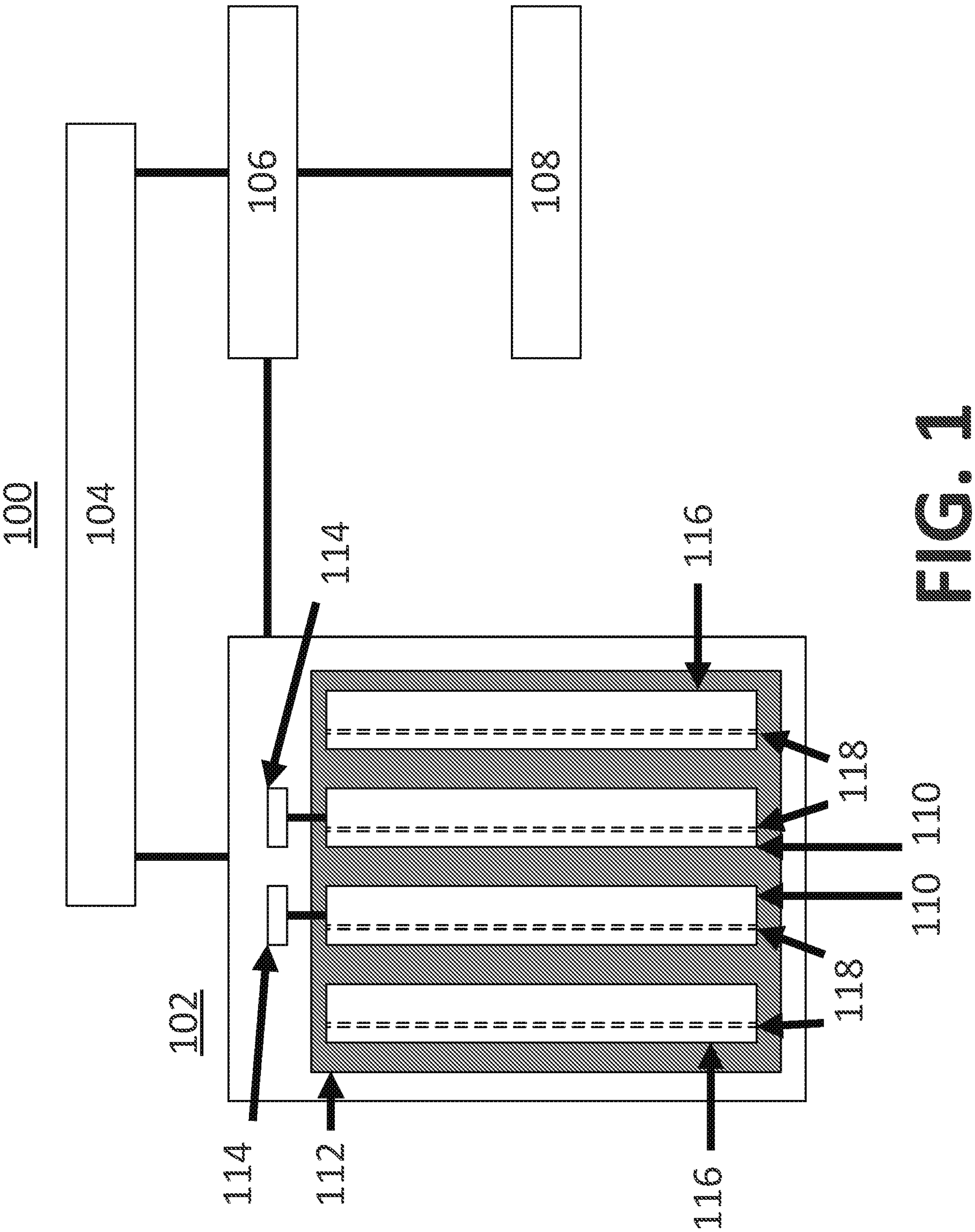
FIG. 1 illustrates a system block diagram of a nuclear reactor system with rotating fuel core, according to some implementations of the present disclosure.
Figure 19:
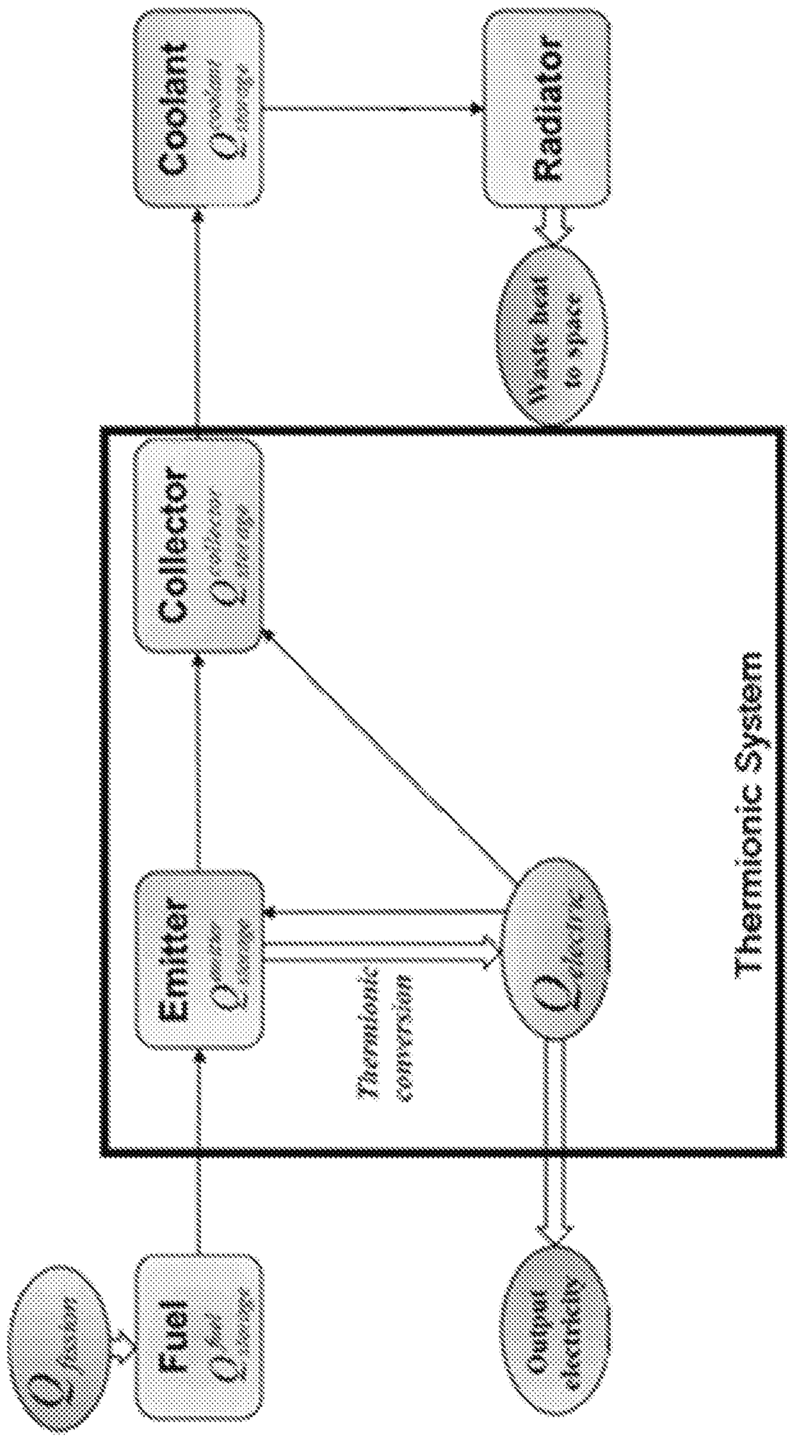
FIG. 19 illustrates the operation of a thermionic system for generating electrical energy, according to some implementations of the present disclosure.

Implementations of the present disclosure include nuclear reactor cores and systems that can be configured to generate thermal and/or electrical energy. In some implementations, the cores and systems operate in a subcritical condition. In other implementations, the cores and systems operate in a critical condition. With reference to FIG. 1, a system block diagram of an example implementation of the present disclosure is illustrated. The nuclear reactor system 100 can include a reactor vessel 102 that includes the radioactive materials (e.g., nuclear fuel) and neutron sources, a controller 104, and an electrical generator 106 for converting the thermal energy created by the fission chain reaction within the reactor vessel into electrical energy that can be used to drive a load 108. Optionally, the nuclear reactor system 100 can include a heat exchanger, which is configured to remove heat from the system 100. As described herein, the heat exchanger can be thermally coupled to the reactor vessel 102 and/or the electrical generator 106. An example heat exchanger is shown in the diagram of FIG. 19.

The reactor vessel 102 can include one or more rotating fuel modules 110. In the non-limiting examples in the present disclosure, the fuel modules are interchangeably described as "rotating fuel cylinders" and "rotating fuel drums." However, this disclosure contemplates that the fuel modules 110 can be made in other geometric shapes. As described herein, each fuel module 110 can be mechanically coupled to a respective fuel-module actuator that is configured to rotate its fuel module. Motor(s) 114 shown in FIG. 1 are example fuel-module actuators.

Figure 2:
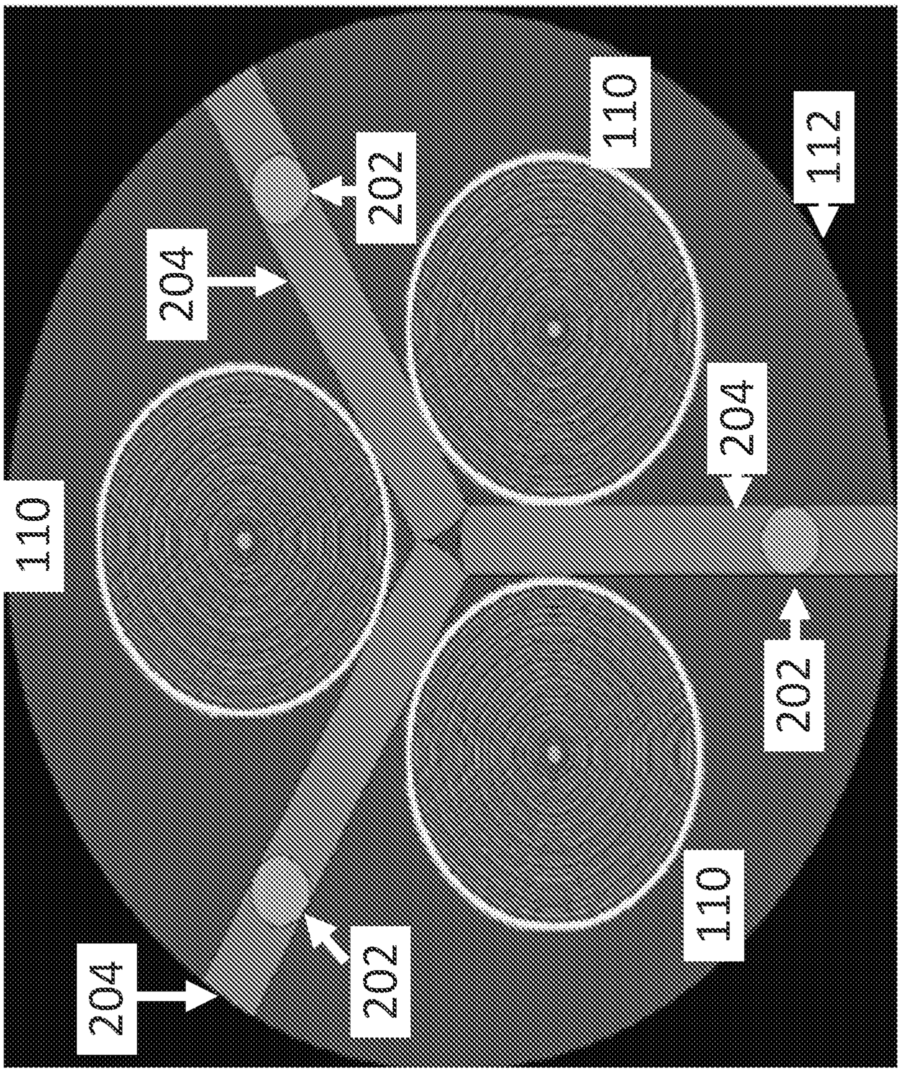
FIG. 2 illustrates a cutaway view of a source driven small modular reactor (SD-SMR) according to an implementation of the present disclosure.

The rotating fuel cylinders can optionally be partially or entirely surrounded by a neutron moderator 112. Neutron moderator 112 is configured to reduce the speed of neutrons travelling with the vessel 102. Alternatively or additionally, neutron moderator 112 is configured to scatter neutrons travelling within the vessel 102 back towards the nuclear fuel. A non-limiting example neutron moderator is graphite. Although graphite is provided as an example moderator, this disclosure contemplates that the moderator 112 can be made of a different material. A cross section of an implementation of a reactor vessel is illustrated in FIG. 2. As a non-limiting example, the reactor vessel shown in FIG. 2 includes three rotating fuel modules 110. This disclosure contemplates providing a reactor vessel with more or less than three rotating fuel modules 110. Neutron sources 202 can be placed inside the moderator 112, and the neutron sources 202 can be configured to initiate and sustain a subcritical nuclear fission reaction in the rotating fuel modules 110. Optionally, neutron sources 202 can be placed inside the moderator 112, and the neutron sources 202 can be configured to initiate a critical nuclear fission reaction in the rotating fuel modules 110. As described herein, each neutron source 202 can be mechanically coupled to a respective source actuator that is configured to move its neutron source. Motor(s) 114 shown in FIG. 1 are example source actuators. In the implementation of the present disclosure illustrated in FIG. 2, there are three neutron sources 202 positioned on tracks or rails 204 formed in the graphite core. This disclosure contemplates providing a reactor vessel with more or less than three neutron sources 202. By controlling the positioning of the neutron sources 202 relative to the rotating fuel modules 110, the rate of reaction can be controlled. Non-limiting examples of neutron sources include alpha neutron emitters and AM—Be, Pu—Be, or Ra—Be. It should be understood that the number and/or arrangement of fuel modules 110 and neutron sources 202 shown in FIGS. 1 and 2 are provided only as examples. This disclosure contemplates a reactor core having a different number and/or arrangement of fuel modules and neutron sources than shown in the figures.

Figure 3:
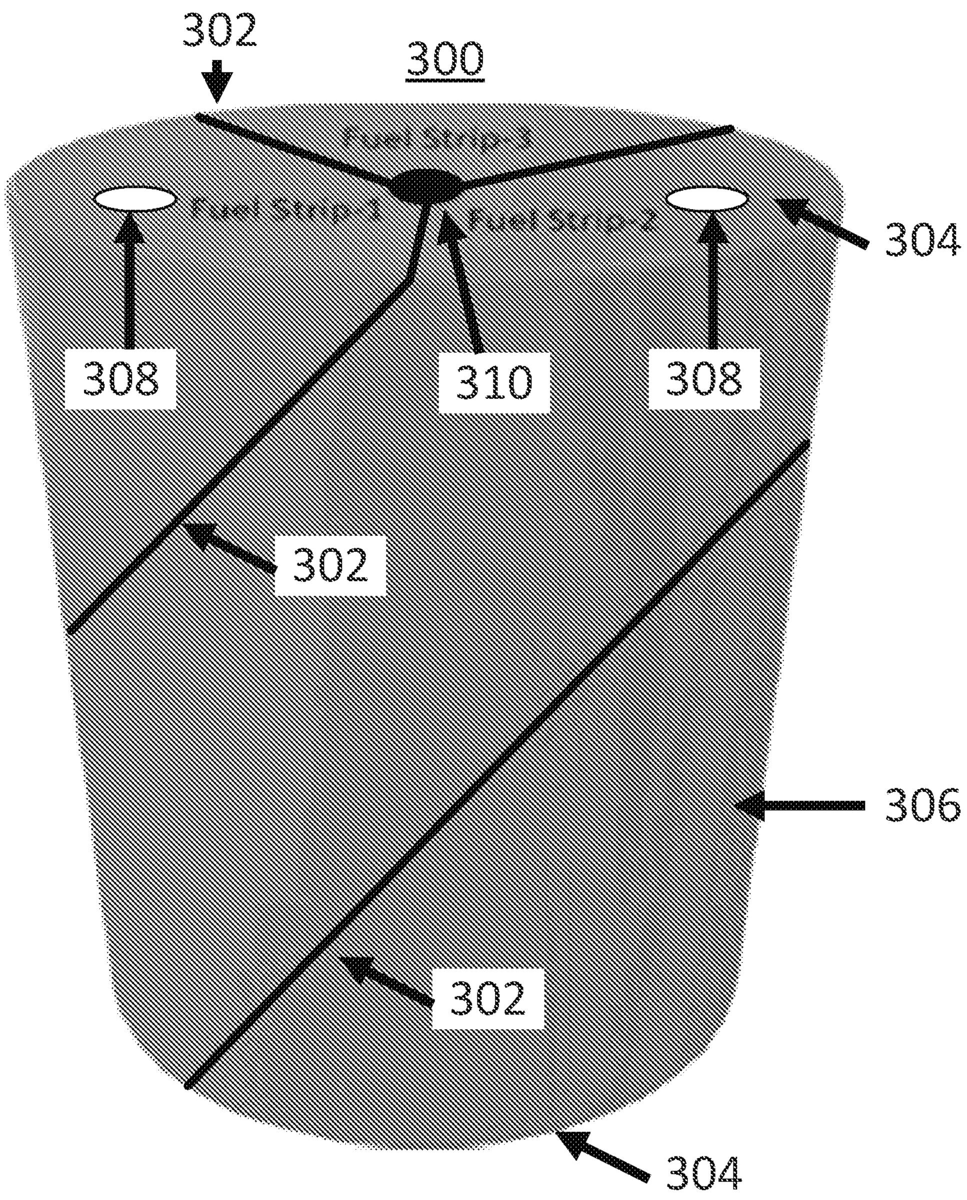
FIG. 3 illustrates a perspective view of a source driven small modular reactor (SD-SMR) according to an implementation of the present disclosure.

The fuel modules 110 illustrated in FIGS. 1 and 2 can include nuclear fuel. The present disclosure contemplates that the nuclear fuel can be arranged on or inside of the fuel modules 110. In implementations of the present disclosure where the fuel module 110 is a cylinder/drum, the fuel can be formed along slices or strips formed in the cylinder/drum. For example, as illustrated in FIG. 3, the nuclear fuel can be arranged as a set of "slices" 302 that are formed in the fuel module 300, which is shaped as a cylinder. These slices 302 can have any depth within the fuel module 300, and can be configured to extend along radial axes defined by the cylinder or by axial axes of the cylinder. These slices 302 of fuel can be interchangeably referred to as "fuel strips" and "fuel channels" throughout the present disclosure.

Based on the shape that the fuel strips/slices 302 form in the fuel modules 300, the configuration of the nuclear fuel can be changed by repositioning the neutron sources 202 and fuel modules 110 relative to one another. As described herein, the fuel modules 110, the neutron sources 202, or both fuel modules 110 and neutron sources 202 can be displaced by one or more actuators. Therefore, the relative positions of each of the neutron sources (e.g. the neutron sources 202 illustrated in FIG. 2) and each of the fuel strips (e.g. the fuel strips 302 illustrated in FIG. 3) can be independently controlled by rotating the cylinders 110 and moving the neutron sources (not shown in FIG. 3). Since the rates of reaction can depend on proximity of the fuel and neutron sources to one another, the controlling these positions can provide control over whether a reaction occurs, the rate of reaction, and the power output of the reaction. This control can be performed using one or more controllers 104 that operate one or more actuators that are operably connected to the fuel drums and/or neutron sources. Non-limiting examples of nuclear fuel that can be used in implementations of the present disclosure include high enriched uranium and low enriched uranium.

As illustrated in the perspective view of FIG. 3, implementations of the present disclosure include fuel modules 300 with fuel strips 302 formed on the outer surface of the fuel drum. The fuel drum 300 can be cylindrically shaped, so the fuel drum 300 can include flat end surfaces 304 and a curvilinear surface 306 between the flat end surfaces 304. Fuel strips 302 can be formed in the surface of the drum and filled with nuclear fuel (e.g., high or low enriched uranium). The fuel drum 300 can also include one or more coolant channels 308 formed in the fuel drum 300 and configured to allow a coolant (e.g., a liquid or gas) to flow through the fuel drum.

The geometry of the fuel strips 302 can affect the rate of reaction of the nuclear fuel in the fuel strips. When the fuel drum 300 is used is used in a reactor core, e.g., as in the system 100 illustrated in FIG. 1, the fuel drum can be positioned near other fuel drums, and configured to rotate relative to those other fuel drums. Example reactor core having a plurality of fuel drums are shown in FIGS. 1 and 2. When the fuel drum 300 illustrated in FIG. 3 is turned relative to the other fuel drums, that can cause the relative position of the fuel strips 302 on the drums to change. This can increase or decrease the rate of the nuclear reaction. For example, in some implementations of the present disclosure, the fuel strips 302 can be arranged so that the fission chain reaction is maintained in a subcritical state, even when multiple fuel modules 300 are placed near each other.

The present disclosure contemplates that different numbers of fuel strips can be used with different geometries and different amounts and types of fuel. As a non-limiting example, the fuel strips can be arranged helically around a curvilinear surface 306 of a cylinder, as shown in FIG. 3. As another non-limiting example, the fuel strips can be vertical fuel channels. Furthermore, in some implementations of the present disclosure, the fuel channels can extend across one or both of the flat surfaces 304 at the ends of the fuel module, as shown in FIG. 3.

In some implementations of the present disclosure, the fuel module 300 can include a shaft or attachment point 310 for turning the fuel drum 300.

Figure 21:
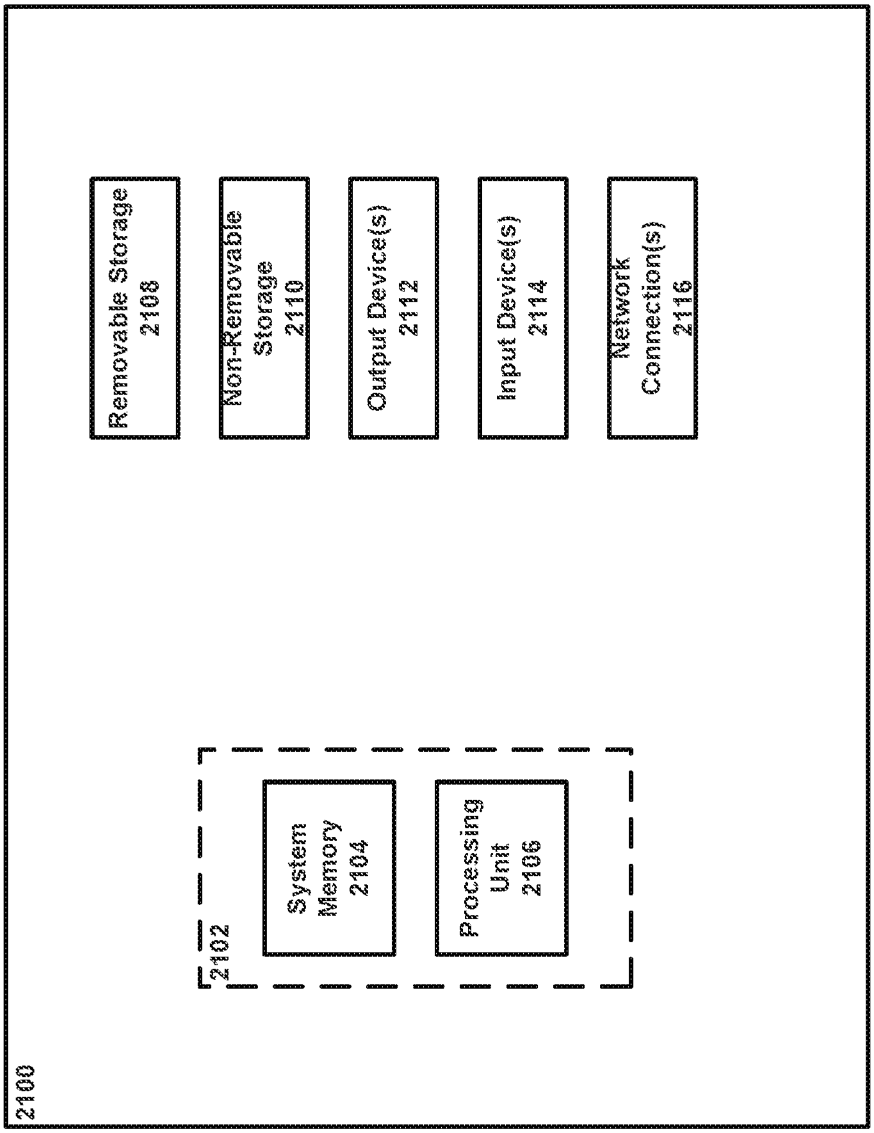
FIG. 21 illustrates an example computing device.

Optionally, the controller can include one or more computing devices (e.g. the computing device illustrated in FIG. 21). The controller can be configured to measure a rate of thermal and/or electrical energy output at the generator 106 and adjust that energy output by controlling the motors 114 to reposition the neutron sources and fuel cylinders to increase or decrease the energy produced by the reactor. As a non-limiting example, the controller 104 can be configured to operate the system 100 so that the fission chain reactions remain in a subcritical condition. Alternatively, the controller 104 can be configured to operate the system 100 so that the fission chain reactions remain a critical condition. The present disclosure contemplates that the controller 104 can optionally compute a computational model of the system 100, and that the control of the system can be based on that model.

The present disclosure contemplates that any kind of electrical generator 106 can be used to convert the heat produced by the reactor into electrical energy. In some implementations of the present disclosure, the electrical generator 106 is a thermionic generator, while other implementations of the present disclosure can use a gas-turbine generator. In some implementations of the present disclosure, the rotating fuel cylinders 110 can include cooling channels 118 configured for fluid (e.g., liquid or gas) flow through the rotating fuel cylinders. The fuel cylinders 110 illustrated in FIG. 1 are shown with one cooling channel 118, however it should be understood that any number or arrangement of cooling channels is contemplated by the present disclosure.

Additionally, implementations of the present disclosure can include one or more control drums 116 located in the graphite moderator 112. The control drums 116 can include reflector materials configured to reflect neutrons back toward the fuel and/or absorber material configured to absorb neutrons. Additionally, the control drums 116 can include cooling channels 118. The control drums 116 illustrated in FIG. 1 are shown with one cooling channel 118, but it should be understood that any number or arrangement of cooling channels 118 is contemplated by the present disclosure.

The present disclosure contemplates that the system 100 can be operated as part of a larger system, e.g. as a single unit in a power plant with multiple nuclear reactors and generators. Similarly, the present disclosure contemplates that the system 100 can be operated using an external power source. For example, a secondary generator such as a solar panel or radioisotope thermoelectric generator (RTG). The present disclosure also contemplates that the system 100 can be operated in combination with an external power source that can provide backup power or startup power. For example, in some implementations the external power source can provide electrical energy to turn the motors 114 illustrated in FIG. 1 or move the neutron sources 202 illustrated in FIG. 2. External power may be used for startup operations after which point the system 100 can generate its own electrical energy.

Additionally, the present disclosure contemplates that the system 100 can include any number of the components illustrated in FIG. 1. As a non-limiting example, the system can include multiple controllers 104, or any number of control drums 116, fuel drums 110, and motors. Similarly, it should be understood that the load 108 can be made up of any number of devices that use electrical energy, or the load 108 can be a power grid with any number of other generators and loads connected to the grid. It should also be understood that the controller 104 can include separate control modules configured to control different parts of the system. Again, as a non-limiting example, the controller 104 can include controller modules for the motors 114 and the generator 106.

The present disclosure also contemplates that any number of reactor vessels 102 and generators 106 can be combined to create a power plant with a greater energy output than the individual generators. As a non-limiting example, the combined nuclear plant can include two of the reactor vessels illustrated in FIG. 1, including all the components shown inside the reactor vessel 102 of FIG. 1. and two generators 106, where each of the vessels 102 is configured to deliver thermal energy 106 to one of the generators. Similarly, one reactor vessel 102 can be configured to deliver thermal energy to multiple generators 106 or, conversely, multiple reactor vessels 102 can be configured to deliver thermal energy to a single generator 106.

It should be appreciated that the logical operations described herein with respect to the various figures may be implemented (1) as a sequence of computer implemented acts or program modules (i.e., software) running on a computing device (e.g., the computing device described in FIG. 21), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Referring to FIG. 21, an example computing device 2100 upon which the methods described herein may be implemented is illustrated. It should be understood that the example computing device 2100 is only one example of a suitable computing environment upon which the methods described herein may be implemented. Optionally, the computing device 2100 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 2100 typically includes at least one processing unit 2106 and system memory 2104. Depending on the exact configuration and type of computing device, system memory 2104 may be volatile (such as random access memory (RAM)), non-volatile (such as read-only memory (ROM), flash memory, etc.), or some combination of the two. This most basic configuration is illustrated in FIG. 21 by dashed line 2102. The processing unit 2106 may be a standard programmable processor that performs arithmetic and logic operations necessary for operation of the computing device 2100. The computing device 2100 may also include a bus or other communication mechanism for communicating information among various components of the computing device 2100.

Computing device 2100 may have additional features/functionality. For example, computing device 2100 may include additional storage such as removable storage 2108 and non-removable storage 2110 including, but not limited to, magnetic or optical disks or tapes. Computing device 2100 may also contain network connection(s) 2116 that allow the device to communicate with other devices. Computing device 2100 may also have input device(s) 2114 such as a keyboard, mouse, touch screen, etc. Output device(s) 2112 such as a display, speakers, printer, etc. may also be included. The additional devices may be connected to the bus in order to facilitate communication of data among the components of the computing device 2100. All these devices are well known in the art and need not be discussed at length here.

The processing unit 2106 may be configured to execute program code encoded in tangible, computer-readable media. Tangible, computer-readable media refers to any media that is capable of providing data that causes the computing device 2100 (i.e., a machine) to operate in a particular fashion. Various computer-readable media may be utilized to provide instructions to the processing unit 2106 for execution. Example tangible, computer-readable media may include, but is not limited to, volatile media, non-volatile media, removable media and non-removable media implemented in any method or technology for storage of information such as computer readable instructions, data structures, program modules or other data. System memory 2104, removable storage 2108, and non-removable storage 2110 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 2106 may execute program code stored in the system memory 2104. For example, the bus may carry data to the system memory 2104, from which the processing unit 2106 receives and executes instructions. The data received by the system memory 2104 may optionally be stored on the removable storage 2108 or the non-removable storage 2110 before or after execution by the processing unit 2106.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1

Implementations of the present disclosure can be used as power sources for space exploration applications. As an example, implementations of the present disclosure can be configured to deliver up to a few megawatts of usable power, and be modular and self-contained payloads that can be landed directly at a site where power is required, serve as a 'charging base' for vehicles, processing equipment, and constitute an important source of heat for permanently shadowed areas (e.g., portions of the moon). The reactor design can include of three rotating cylinders, with fuel distributed throughout each cylinder in fuel strips in a 'barber pole' arrangement. By tuning the geometry of the fuel, and the rotation of the cylinders, fine control of both the amount of generated power and the longevity of the reactor can be performed.

Example implementations of these reactor designs show that the reactor fits within a volume envelope of approximately 1 $m^3$, and up to three individual reactor/landers can be arranged within the cross-section of a 3.5 m diameter rocket fairing. Consequently, these can be launched in bulk, either on a dedicated mission for a smaller launch vehicle, or as auxiliary/secondary payloads aboard larger vehicles such as NASA's Space Launch System (SLS). An example implementation can be configured to provide 3 MWatt of continuous power, with an expected lifetime of 5 years. Such a reactor can be manufactured 'at scale,' and is comprised of high enriched uranium (HEU) or low enriched fuel (LEU) with TRISO fuel.

The Small Modular Reactor (SMR) with the features of an evolutionary and lifetime core, simple and modular design, multiple "walkaway" passive safety systems, and autonomous control system with assorted instrumentation is disclosed that is also safe-guardable, cost competitive, and commercially viable. The Rotating Fuel Core with Fuel Strip (ROFFUS) SMR has a containment layout based on a sealed two chamber containment for the reactor vessel and the thermal power conversion system. Primary cost reduction is achieved by a compact design of each chamber that is a factory fabricated component and transportable by truck or rail to a nuclear power site.

Three sets of passive safety systems can be present that can remove the core decay heat without any AC power source or even any operator intervention for an indefinite period of time. In order to: (i) burn the fuel effectively, (ii) operate without refueling complexity, and, (iii) control the reactivity autonomously for operational and safety constraints, ROFFUS has: (1) inherent safety and intrinsic characteristics to avoid the need for continuous shifts of operators and security forces, (2) a lifetime core (a design choice), (3) a scalable design, and does not depend on novel components (such as a new fuel type) that require a multi-decade development program.

ROFFUS core can include several motor-operated rotating cylinders (RCs) to achieve a lifetime core and effective autonomous core control. The RCs can include: (i) three to six closely packed cylinders with a non-traditional fuel assembly, and, (ii) additional several cylinders that are typically control drums containing reflector and absorber material. The number of rotating fuel cylinders and total diameter can depend upon the desired power level. Each cylinder contains fuel and vertical cooling channels (CCs). The cylinders are imbedded in a larger cylindrical structure of graphite with no fuel and sufficient CCs to avoid overheating the graphite during operations from neutron and gamma heating. The integration of the components or inclusion in nuclear context, as well as the "candy stripe" fuel cylinders, are novel.

Figure 8:
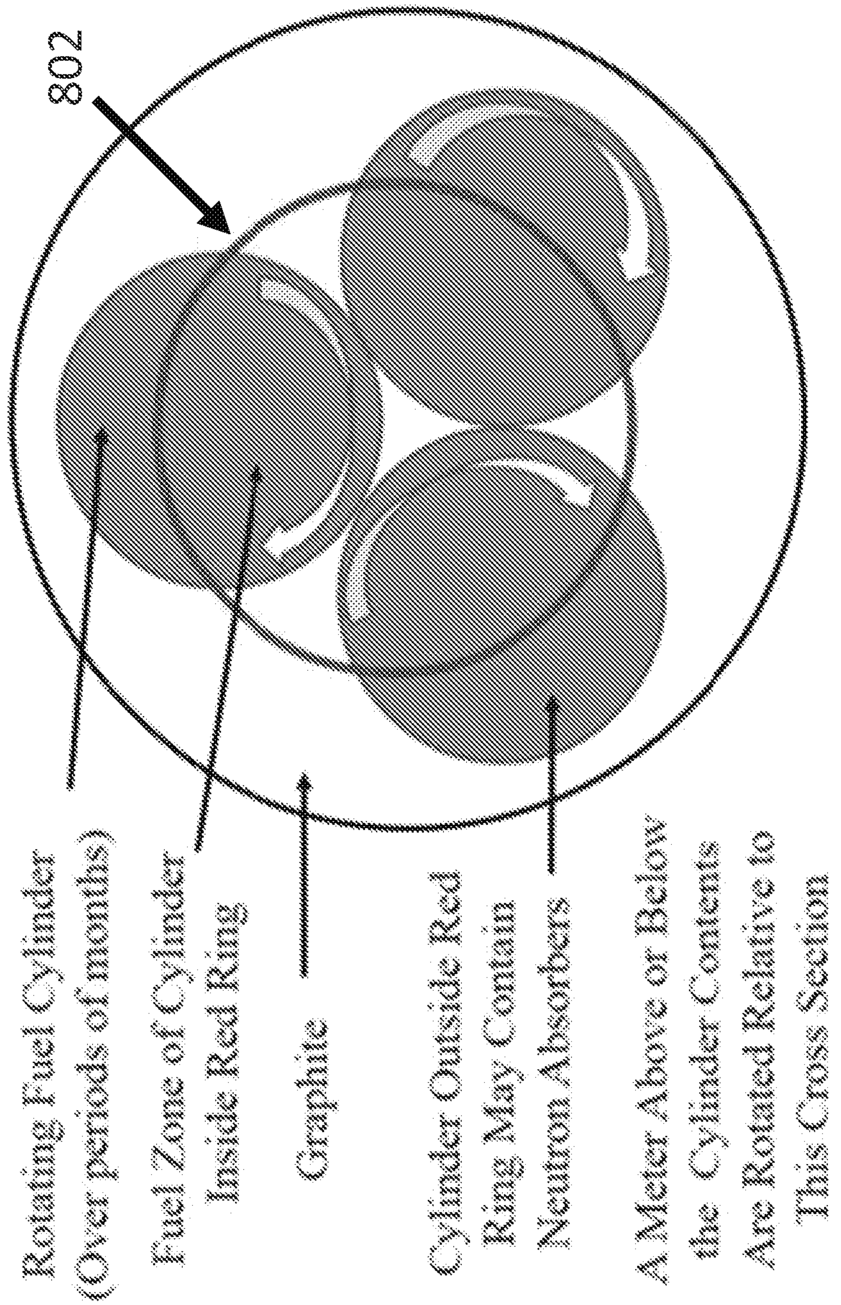
FIG. 8 illustrates a cross section of an active reactor zone for an implementation of the present disclosure.

Two alternative evolutionary life-time core designs using RCs are considered in this example implementation of the present disclosure: (1) RCs with neutron absorbers (illustrated in FIG. 8); and (2) RCs with multiple strips (illustrated in FIGS. 9-11).

For RCs with neutron absorbers, both fuel and neutron absorbers can be used in RCs. The internal structure of each cylinder can contain separate fuel channels with TRISO fuel particles—the same basic fuel design of a prismatic-block high temperature gas cooled reactor (HTGR). The fuel cylinders can have the same cross section at any elevation but the TRISO fuel particles can have a special loading pattern in the vertical direction that is similar to a candy stripe—a spiral fuel loading pattern where at any horizontal level there is fuel on one side of the graphite cylinder but not on the other side. When the fuel cylinders are rotated so the fuel at a particular horizontal level is toward the reactor center, the reactor can go critical in that vertical position and produces power. This occurs at only one level of the cylinder because of the spiral pattern of fuel loading—at other levels the fuel in each cylinder is facing further outward. The reactor initiates operations with the fuel zone of each cylinder facing each other at the top of the reactor core. As that fuel zone is burnt out, the cylinders are rotated so the reactor zone moves downward in the reactor core. It is possible for rotation of the cylinders to move the active core region up and down on a regular basis to obtain relatively uniform burnup over the vertical height of each cylinder-a rotation over a period of several months. A long core life can be achieved by choosing an appropriate height for the reactor core. This design can also use neutron absorbers outside of the red ring 802 as illustrated FIG. 8. If the cylinders are rotated in the opposite direction and the absorber section is in the red ring, the reactor can be shut down.

Figure 9:
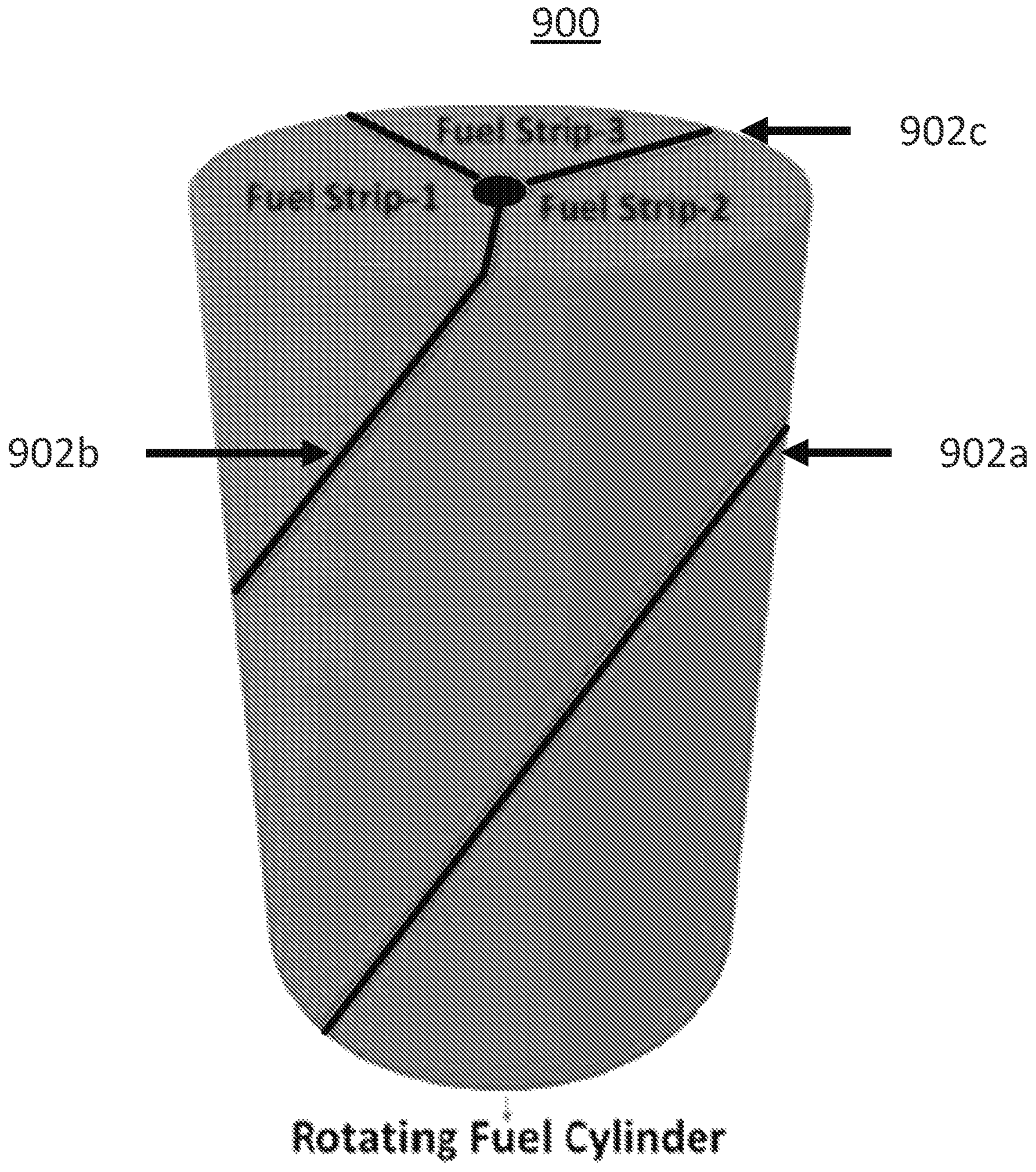
FIG. 9 illustrates a perspective view of a rotating fuel cylinder according to one implementation of the present disclosure.
Figure 10:
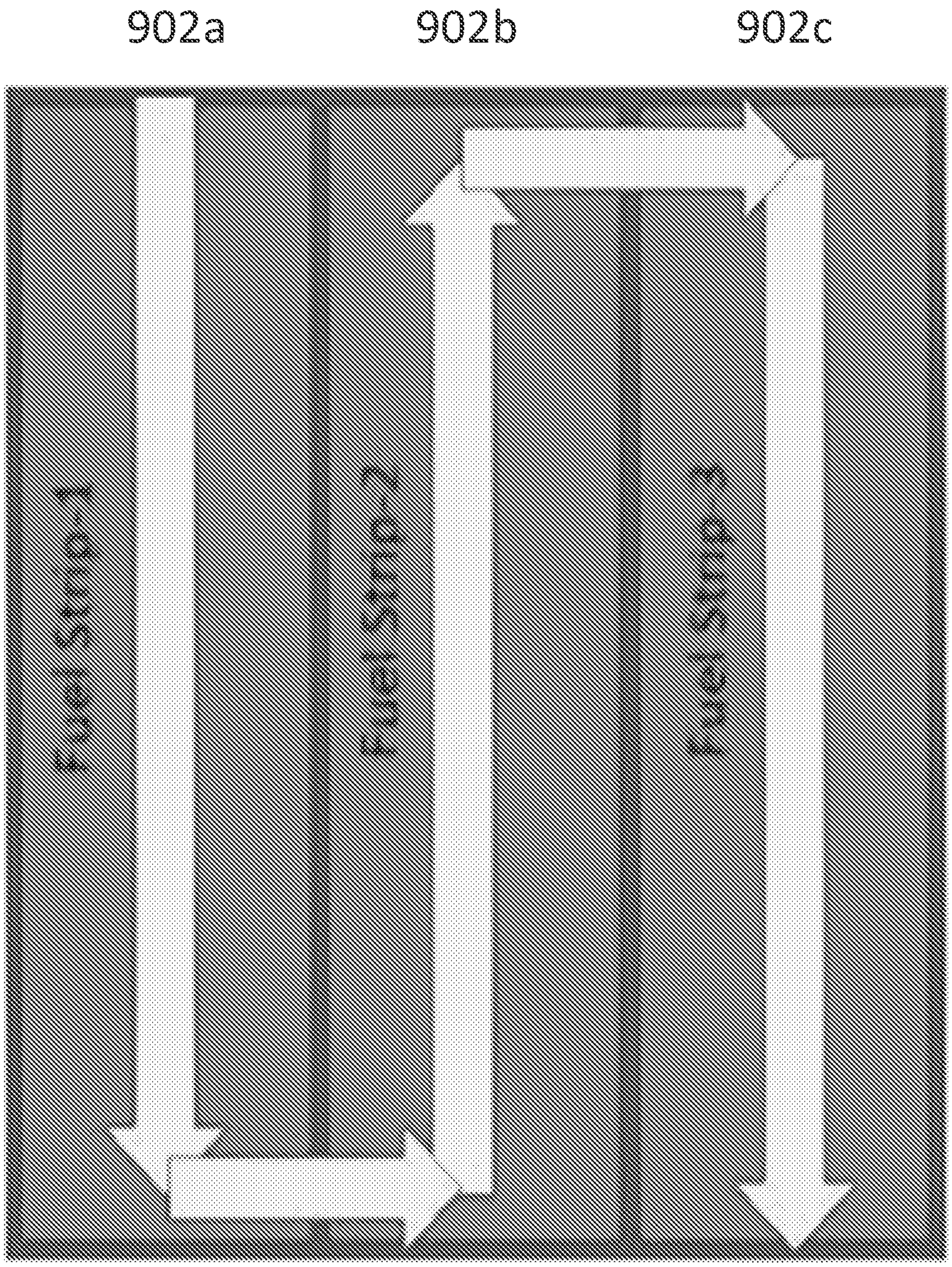
FIG. 10 illustrates a burning path for an implementation of the present disclosure including rotating fuel cores with fuel strips.
Figure 11:
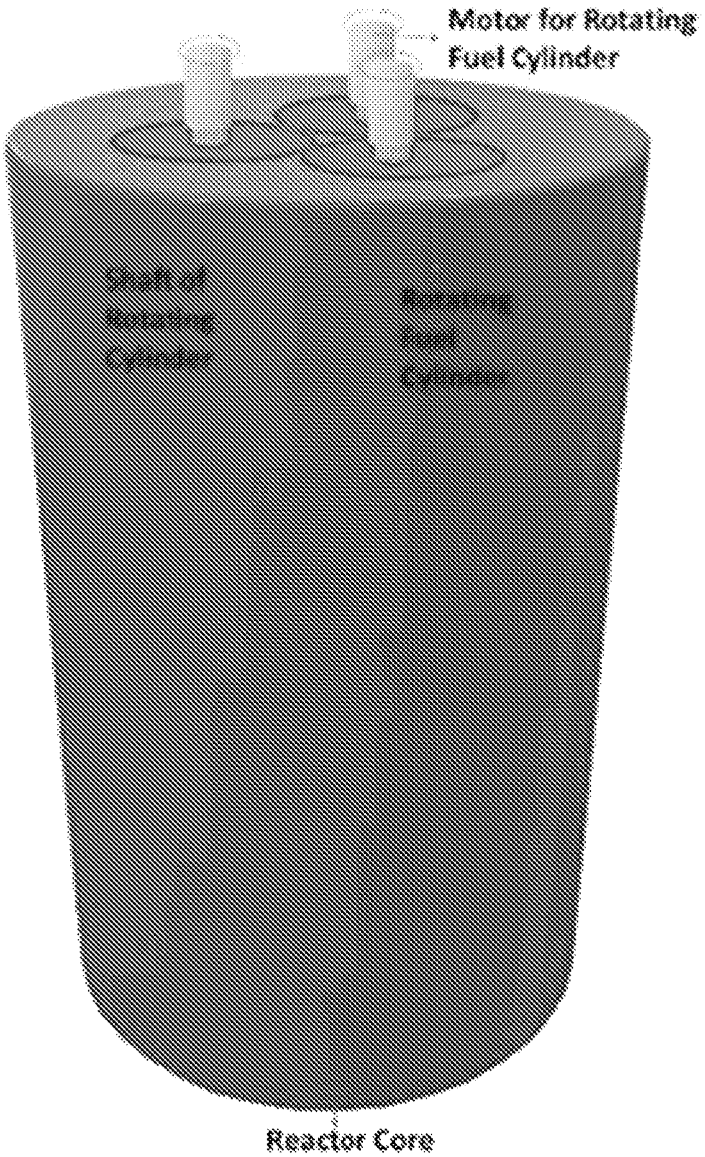
FIG. 11 illustrates a perspective view of a reactor core with three rotating fuel cylinders, according to an implementation of the present disclosure.

As illustrated in FIG. 9, a second alternative RC design for a fuel module 900 with multiple strips 902*a* 902*b* 902*c* can decrease both the height of the RCs and pressure drop within CCs to reduce the volume of the fuel elements and making the core more compact which reduces pump or compressor power and increases thermodynamic efficiency. In this design, each fuel strip 902*a* 902*b* 902*c* illustrated in FIG. 9 can have different fissile and fertile isotope content. For instance, Fuel Strip 1 902*a* in can have relatively enriched fuel (such as, 20% enrichment), Fuel Strip 2 902*b* can have a mixture of fertile and fissile fuel and Fuel Strip 3 902*c* can have fertile dominant fuel. Fuel Strips 1, 2 and 3 902*a* 902*b* 902*c* can be burnt in order, as illustrated in FIG. 10, by rotating the cylinders. When Fuel Strip 1 902*a* is being burnt, the fertile isotopes can be converted to fissile isotopes by using extra neutrons from the fissioned fissile isotopes of Fuel Strip 2 902*b*. Then the fertile isotopes of Fuel Strip 3 902*c* can be converted to fissile isotopes when Fuel Strip 2 902*b* is burnt. Since this design does not use neutron absorbers in initial fuel configuration, the reactivity can be decreased by inversely rotating the cylinders. In other words, inversely rotating RCs can bring the burnt fuel close to the core center so that the core will shut down itself automatically. The increased safety, security, and economics can be a result of the ROFFUS core design with low enriched TRISO fuel and the reactor location in a silo for physical protection. TRISO fuel can potentially withstand explosive shock waves that destroy the graphite fuel block but not of the microspheres with fuel and fission products. Reactivity (over-power) accidents are prevented by geometry control to minimize fuel loading anywhere in the core while allowing a very long-lived reactor core and a Doppler temperature coefficient that shuts down the reactor if it overheats independent of control rods. Fuel failure by overheating from decay heat cannot occur due to a combination of low-average power densities, high fuel failure temperatures, high heat-capacity core and passive decay heat removal from the core. Again, it should be understood that the fuel "strips" can have any amount of depth, and can be formed as three-dimensional slices formed in the geometry of the fuel module 900.

Implementations of the present disclosure include a Source Driven Small Modular Reactor (SD-SMR) design that can operate autonomously for a long time in harsh environments (high cosmic ray and low temperatures). Implementations of the present disclosure which allow for the reactor operation in a subcritical condition can remove the need for control rods, simplify the reactor operation control, allow for natural cooling, the use of a "walkaway" passive safety system, provide flexibility in the use of different fuel compositions, and significantly diminish the feedback effects caused by the fuel burnup.

The core of the proposed SD-SMR is comprised of HEU or LEU TRISO fuel and graphite moderator. The TRISO fuel is placed in three cylindrical annuli, surrounded by graphite and the reactor vessel. To achieve a neutron balance, moveable neutron sources are placed within the fuel annuli, for example, as illustrated in FIGS. 2 and 3. Additionally, moveable neutron sources are placed in radial rails within the graphite for controlling the reactor power. For the neutron sources, the use of radioactive-based neutron generators, e.g. (α, n) sources such as Am—Be, Pu—Be, or Ra—Be are contemplated. FIG. 4 provides intensity of neutron sources per unit gram of alpha emitter and per unit volume of a reference generator of size 1.9 cm diameter and 5.1 cm height.

Figure 5:
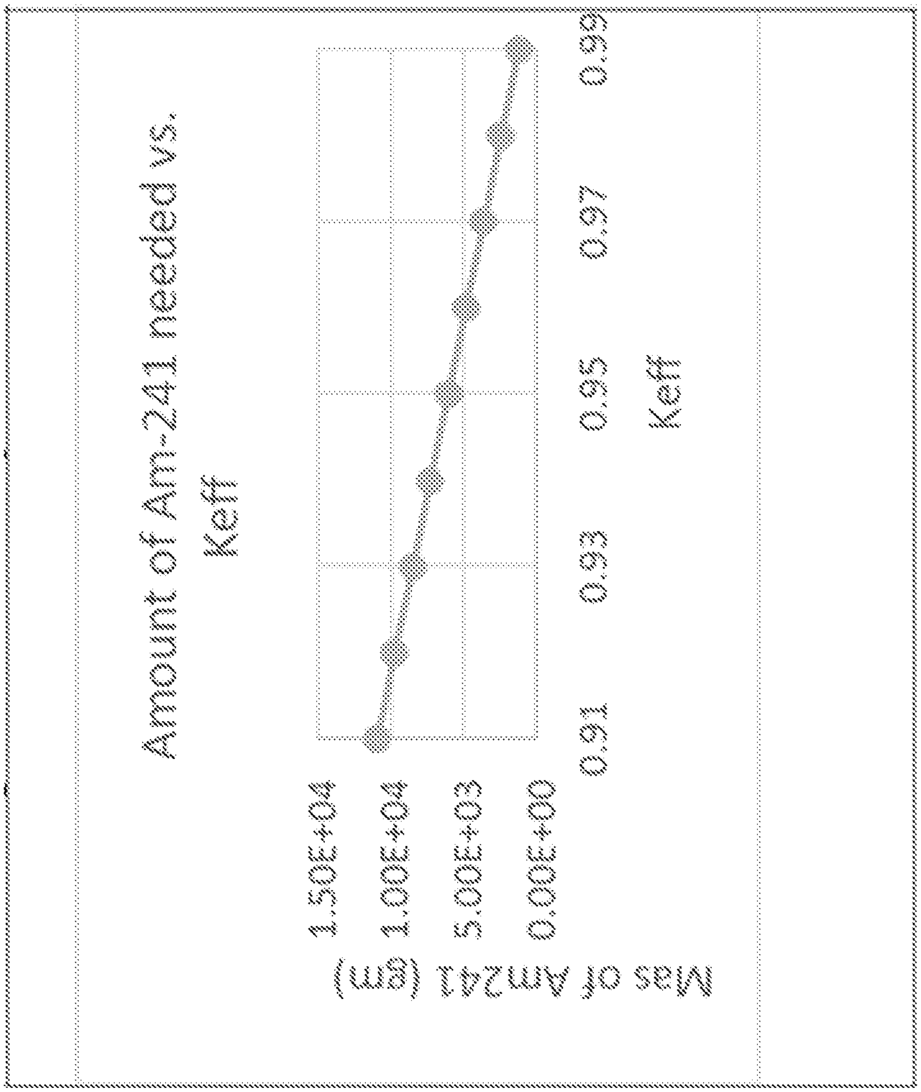
FIG. 5 illustrates a plot of the quantity of Americium 241 plotted vs $k_{eff}$ (reactivity coefficient k-effective) for an implementation of the present disclosure.
Figure 6:
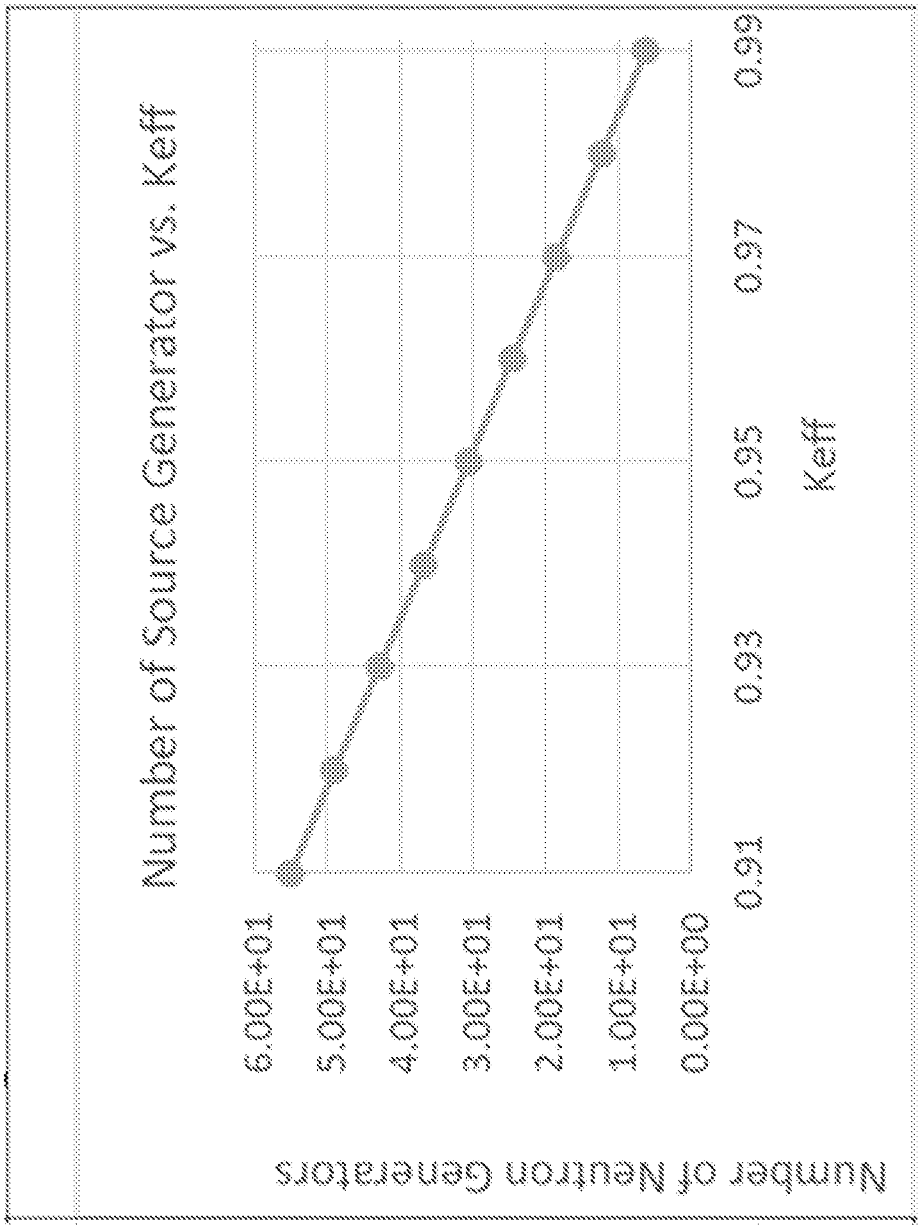
FIG. 6 illustrates the number of source generators plotted vs $k_{eff}$ for an implementation of the present disclosure.

To achieve a power of 3-4 MW, a neutron flux of about 1.0×10^12 #/cm-2 s can be required. For an Am—Be source, FIGS. 5 and 6 show the amount of mass of 241Am and corresponding number of generators needed to achieve different $k_{eff}$ values, respectively, with the arrangement in FIGS. 2 and 3. These results indicate that for a $k_{eff}$ of 0.95 (i.e., a 5% subcriticality level) about 6 kg of 241Am or about 30 sources are needed.

Implementations of the disclosed reactor design can be suitable for commercial exploitation to provide power on the surface of the Moon.

The disclosed rector design can be a derivative High Temperature Gas Reactor (HGTR). Challenges in the neutronics modeling of HTGRs that were overcome include: (1) high burnup and high temperatures expected, (2) dealing with double fuel heterogeneity and spatial power oscillations, and (3) quantification of uncertainties. The MCNP and SERPENT codes were used to perform burnup calculations for the disclosed rector design and to develop a predictive model to optimize the rotation of the cylinders and movement of the sources to achieve uniform burnup over the vertical height, including possible impact of uncertainties.

Figure 12:
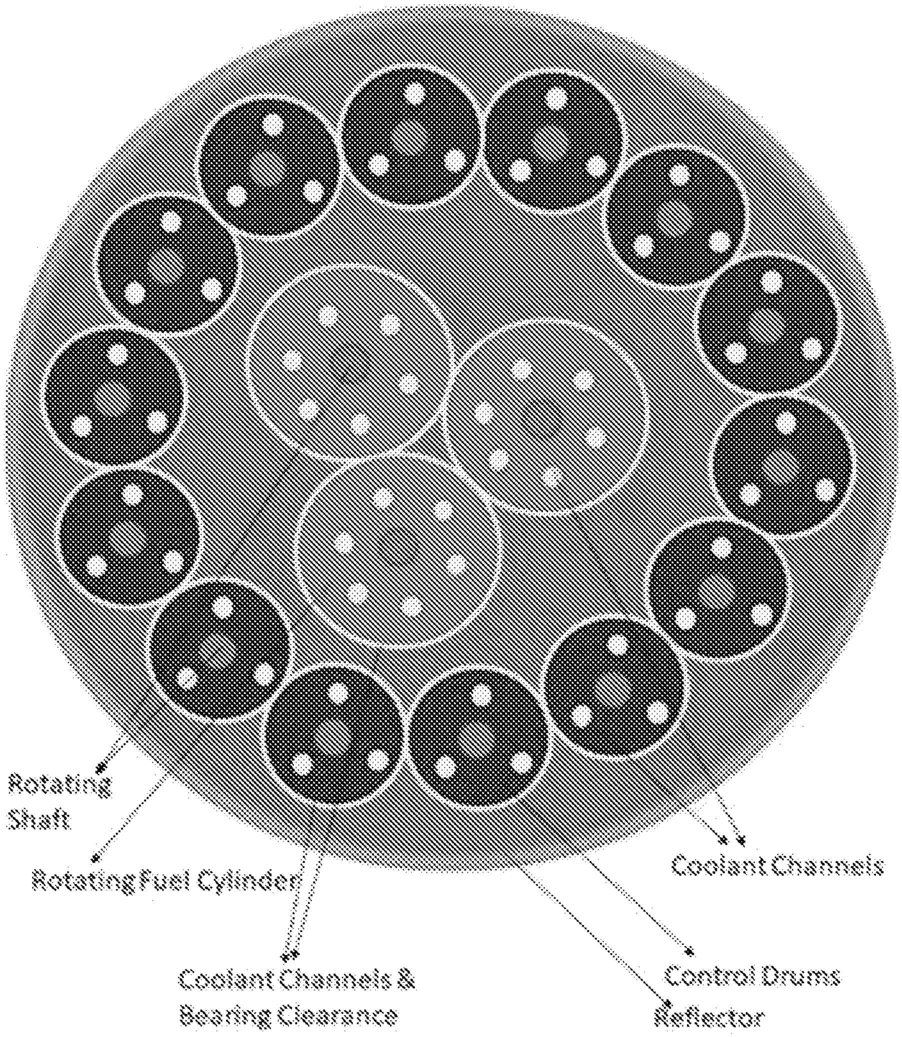
FIG. 12 illustrates a cross sectional view of a reactor core with control drums and three rotating fuel cylinders, according to an implementation of the present disclosure.

Thermionic energy conversion (TEC) methods can be used to convert heat to electricity. Electrons evaporate from a hot cathode (heated by nuclear fuel) into a vacuum and can be collected by anode (cooled by helium coolant) to generate electric current. Implementations of the disclosed rector design's nuclear core can be cooled by helium gas flowing through the CCs in the RCs and control drums as well as bearing clearance, as illustrated in the thermal hydraulic model shown in FIG. 12). The power generation cycle is designed and optimized to maximize the generated electricity by using RELAP5-3D/SCDAP. Strong feedback effects between TH and neutronics was expected for small size HTGRs, such as the disclosed rector design. Therefore, the transient behavior of the disclosed rector design was modeled by advanced coupled tools, such as the coupled codes of RELAP/SCDAP and NESTLE, to capture the feedback effects of TH, reactor kinetics, and fuel behavior. The flexible modeling features of the coupled codes is used to model rotating fuel cylinders and changing fuel characteristics with fuel performance code characteristics. The neutronic characteristics of the disclosed rector design system were also benchmarked with the MCNP and SERPENT codes.

Materials aspects of the disclosed rector design are very similar to a HTGR and therefore rely on the knowledge developed under the U.S. Department of Energy (DOE) activities to qualify TRISO fuel particle, graphite and other structural components. Analysis was conducted to ensure that the disclosed rector design operation conditions fit into the irradiation conditions on the moon. The primary focus was verifying that the existing data were sufficient to ensure integrity of materials component under operating conditions suitable for autonomous control, online monitoring of components for maintenance and accident conditions, specifically focusing on reactivity insertions and decay heat removal.

Figure 13:
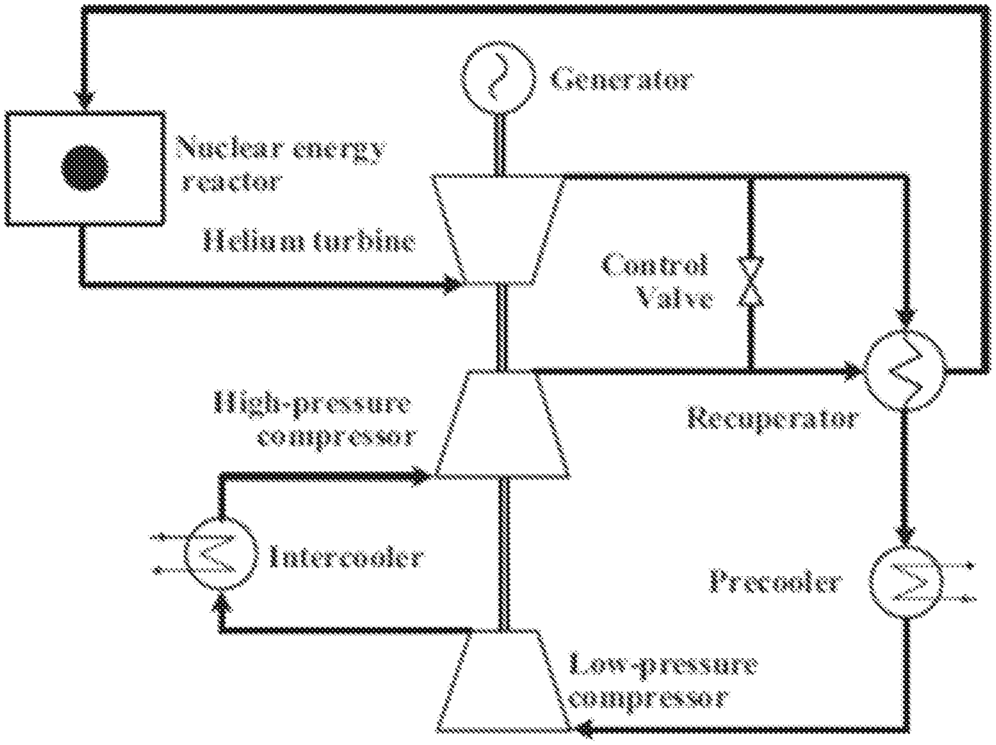
FIG. 13 illustrates a system block diagram of a high-temperature gas-cooled reactor direct gas turbine cycle that can be used to generate electrical energy according to some implementations of the present disclosure.

Implementations of the present disclosure can include Direct Brayton Cycle based power generation cycle (PGC) as illustrated in FIG. 13. The power generation cycle can be designed based on nuclear regulator commissions' general design criteria for nuclear power plants. The PGC including variable speed turbine-compressor for effective load following capability, compact heat exchangers, valves and control system of this cycle was designed by using RELAP5-3D. DBA and operational transients were evaluated with RELAP5-3D model for the proposed PGC.

The design basis accidents and operational transients with disruptive consequences were evaluated using the RELAP5-3D and MELCOR codes. Safety assessment of the disclosed rector design was supported using a dynamic probabilistic safety assessment (DPSA) approach. DPSA is particularly appropriate for systems with passive safety features and digital instrumentation and control systems as with the disclosed rector design.

Implementations of the disclosed rector design can simplify the in-core instrumentation and reduce the number of required sensors, which, as a consequence, can reduce the complexity of the sensor network and the sensor fault probability. On the other hand, autonomy can require deployment of a larger number of sensors for reactor control and safety monitoring. Line sensors for distributed temperature sensing and sensor networks for flux mapping can be used to replace point sensors to provide both safety and health monitoring with less numbers but adequate information. One challenge is the inadequate radiation hardness evaluation for new sensor materials. A targeted experiment was performed for the down selection of the sensor candidates for temperature and neutron flux mapping.

The mass and dimensions of implementations of the disclosed rector design can it ideal for launch either in multiples within a dedicated launch vehicle, or as a secondary payload on a launch to Trans-Lunar Injection. Implementations of the disclosed rector design can be a dedicated, single, and modular payload aboard a robotic lander base, such as the small/medium Lander Designs pursued by NASA/Marshall Space Flight Center and the Johns Hopkins Laboratory in 2010. The construction models of ROFFUS4Space chambers were designed to reduce capital cost, while meeting U. S. Nuclear Regulatory Commission requirements for safety. Isolation systems were designed in ANSYS/ABAQUS platforms to reduce potential seismic effects from moonquakes—caused by lunar tides and meteoroid impacts—on safety-critical components and to achieve a nearly uniform design independent of characteristics of sites.

A modularized design can allow for shorter construction times to reduce financial exposure and schedule risk, primary reasons for nuclear terrestrial power plant high capital costs. The high degree of factory manufacturing and assembly results in less total need for construction support resources for project management and quality assurance and control.

A small lander (e.g., 155 kg dry mass) and its disclosed rector design payload can be decelerated in the lunar environment through the use of a STAR 30BP solid rocket motor attached to the bottom of the lander. Landing can be accomplished using three 445 N bi-propellant axial divert and attitude control system DACS engines which reduce the vertical and lateral velocity to ~1 m/s, as well as six 30 N vernier engines to control spacecraft attitude.

All landing can be automated. Once landed, the reactor can be commissioned to provide all required heat and power for the duration of the mission. A warm-gas testing program of the prototype lander was accomplished successfully at NASA/Marshall in the early 2010's, making this technology high enough on the TRL scale (approximately TRL 7) to minimize further development costs.

Example 2

Implementations of the present disclosure include source-driven subcritical reactor design that can operate autonomously for a long period of time in harsh environments (high cosmic ray and low temperatures). These implementations are referred to as Monet (autonoMous sOurce driveN rEacTor), and allow for the reactor operation in subcritical condition, removes the need for control rods, simplifies the reactor operation control, allows for natural cooling, allows for the use of a "walkaway" passive safety system, provides flexibility in the use of different fuel compositions, and significantly diminishes the feedback effects caused by the fuel burnup. The present disclosure includes a high level description of the proposed reactor concept and describes the power conversion system and space flight system integration.

Reactor Core: The core of implementations of the present disclosure is subcritical and is comprised of a variable enrichment low enriched (LEU) TRISO (TRi-structural ISOtropic particle) fuel, graphite moderator, and Am—Be neutron source. Implementations of the present disclosure can offer a safe, scalable, and autonomous design that can operate in the harsh moon environment. The subcriticality can eliminate the potential for reactor criticality accidents, provides significant flexibility in the fuel choice and its enrichment, and consequently can simplify reactor control. Additionally, to achieve a more uniform fuel burnup and eliminate the need for control rods, implementations of the present disclosure can perform rotation of fuel drums with variable fuel enrichment resulting in a barber-pole configuration (e.g. by forming one or more strips or slices of fuel in the fuel drums in a helical or "barber-pole" shape).

Figure 14B:
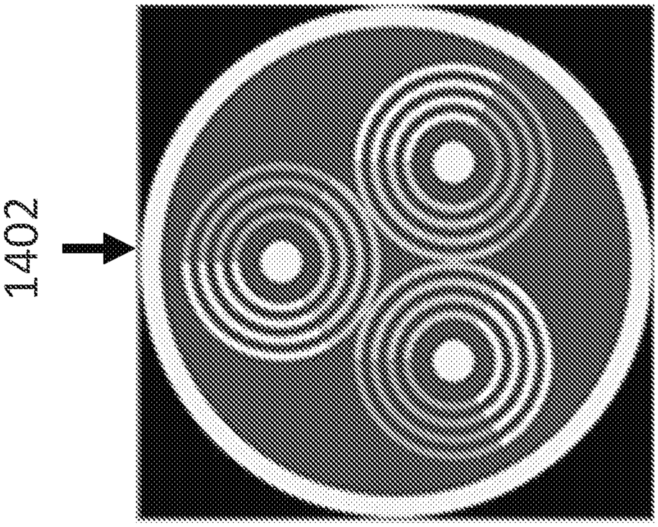
FIGS. 14A-14E illustrate cross sections of core designs according to implementations of the present disclosure.
Figure 14A:
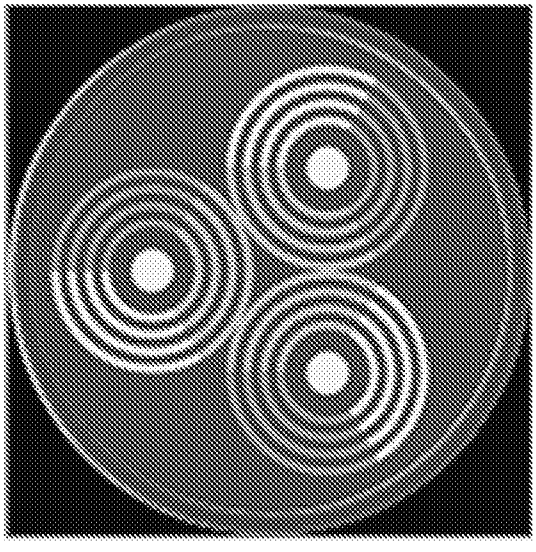

Implementations of the present disclosure can include different core designs with different amount of fuel, moderator, and source. FIGS. 14A and 14B illustrate two example implementations for which a preliminary Monte Carlo calculations were performed to determine the degree of subcriticality and the amount source needed and the resulting reactor mass for a given power.

The common features among the above designs are: three fuel drums containing fuel annuli with sectors of different enrichments including 19.75%, 3.5%, and 0.72% (natural uranium); and, a central region of movable source. They differ in the thinner fuel annuli and presence of an outer source drum 1402 (light green region) in the implementation of the present disclosure illustrated in FIG. 14B).

Figure 15A:
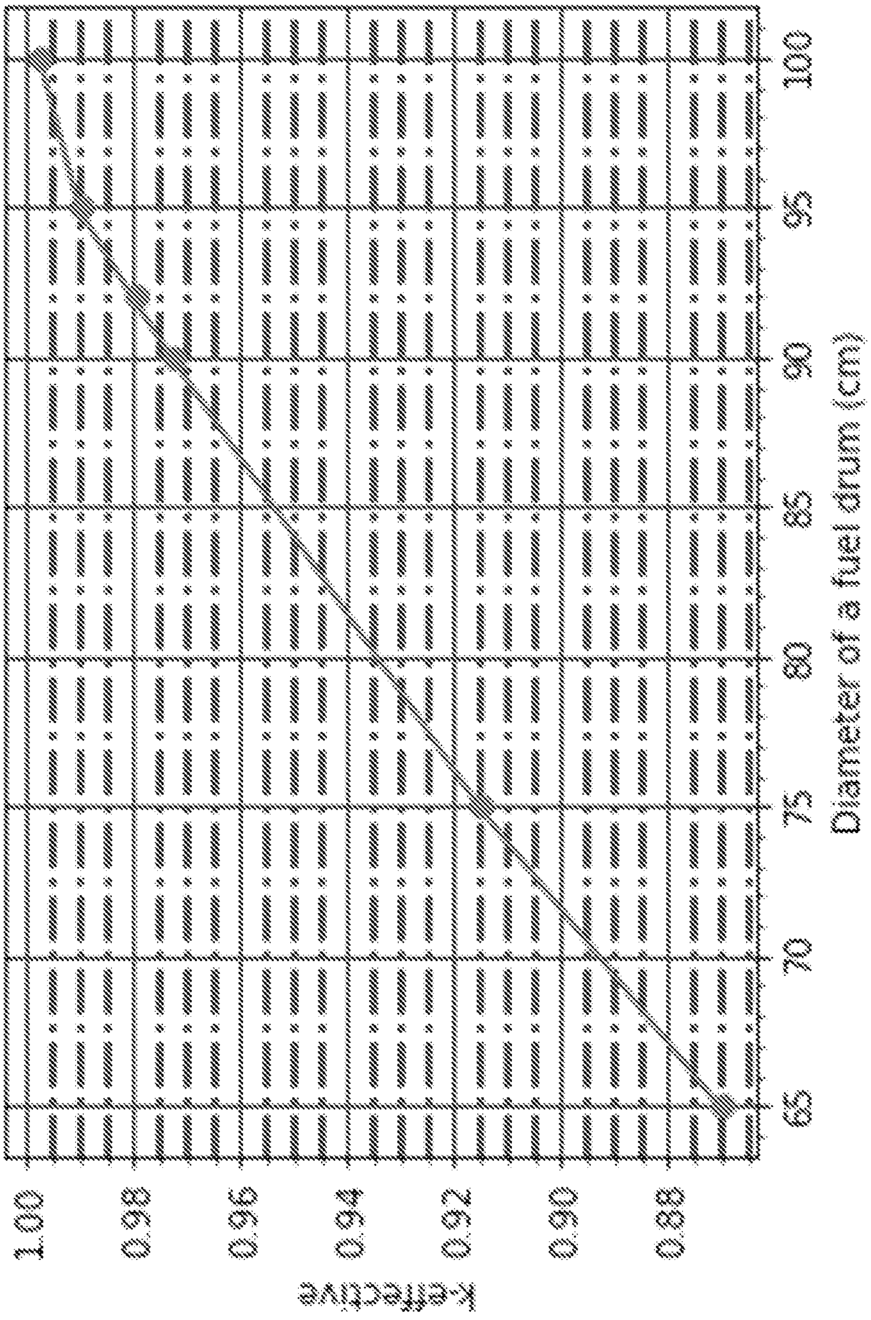
FIGS. 15A-15B illustrate plots of $k_{eff}$ for implementations of the present disclosure.

For example implementation #1 (FIG. 14A), with a reactor height of 267 cm, a Monte Carlo calculations was performed for different fuel-drum sizes of diameters of 65 cm, 75 cm, 90 cm, 92 cm, and 95 cm to obtain a maximum power of 10 kW. FIG. 15 illustrates the behavior of the reactor multiplication factor (kefr) as a function of drum sizes. The $k_{eff}$ can increase with the increasing of drum size; i.e., larger amount of fuel, therefore, resulting in the reduction of source needed from 1.3E14 n/s to 1.1E13 (n/s), (shown in FIG. 16).

Figure 14E:
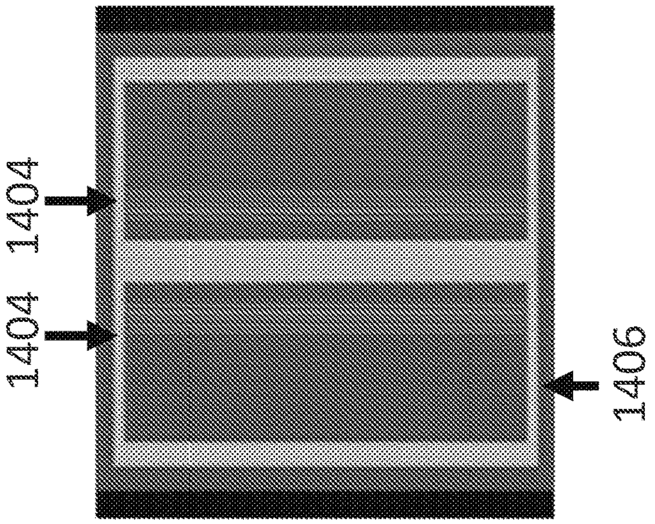
Figure 14D:
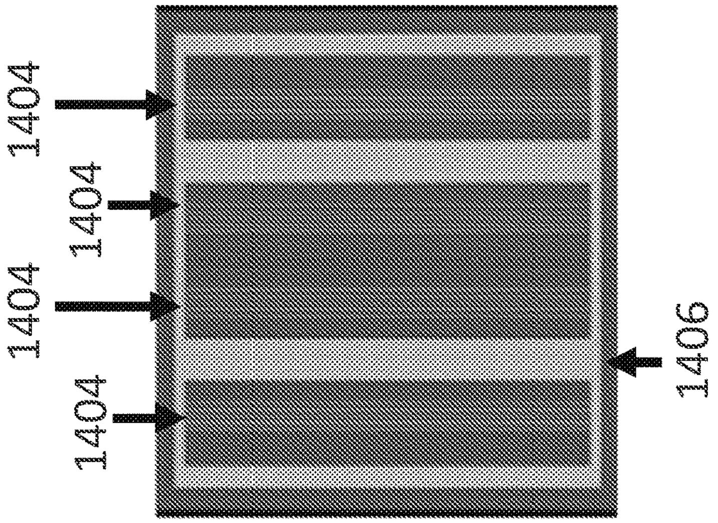
Figure 14C:
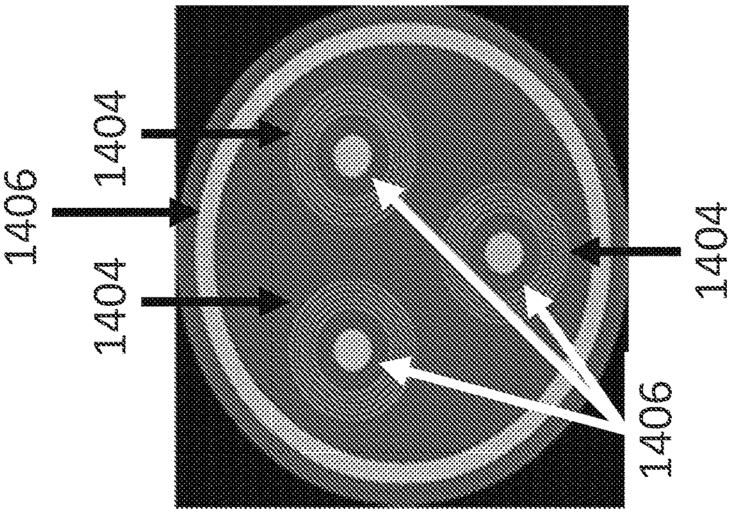

FIGS. 14C-14E show implementations of the Monet core including three rotating fuel drums made of annuli of fuel 1404 separated by regions of graphite. For this non-limiting example, the external source 1406 is placed at the center of each drum, in a cylindrical shell outside the drums, and on the top and bottom surfaces of the core (see FIGS. 14C and 14D). The source regions at the center of the drums are surrounded by graphite reflectors. The overall radius and height of the core including the reflector regions are 119 cm and 73 cm, respectively.

Figure 15B:
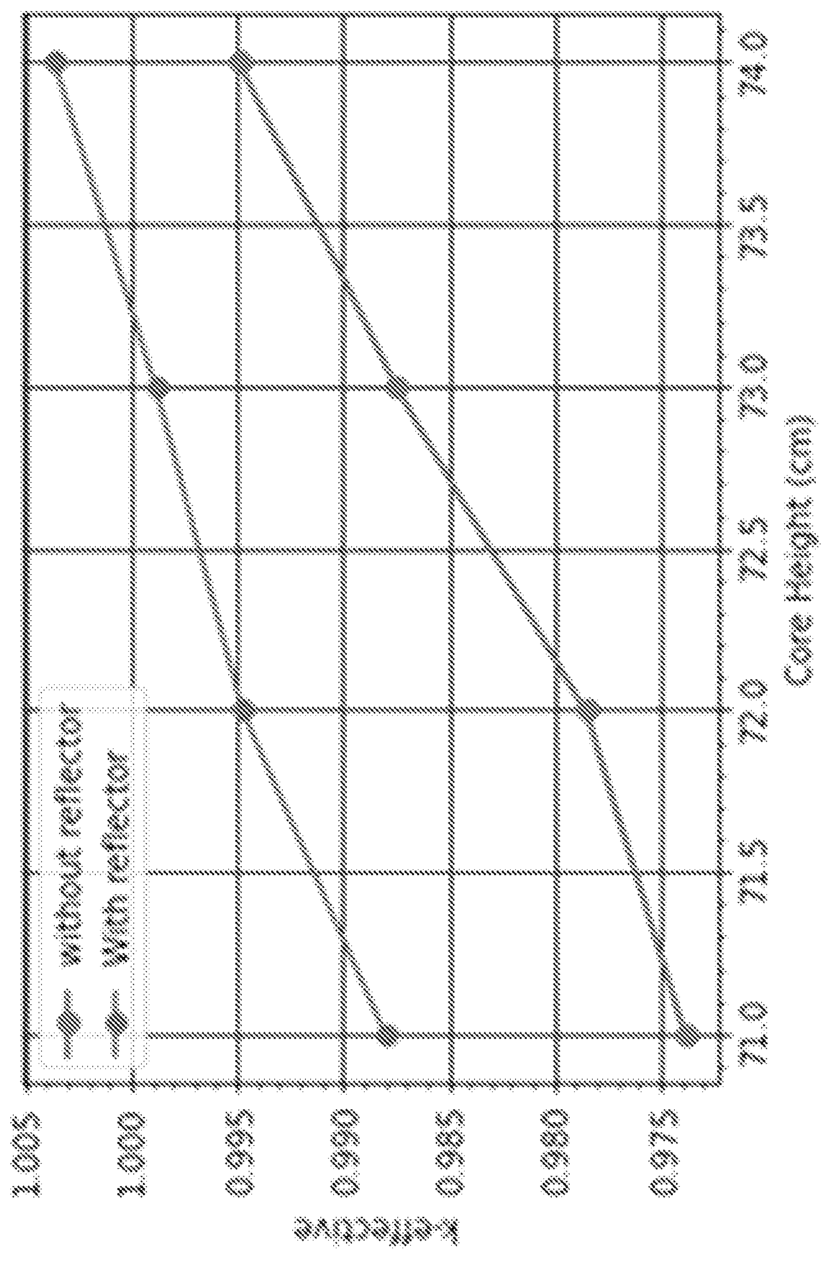
Figure 16:
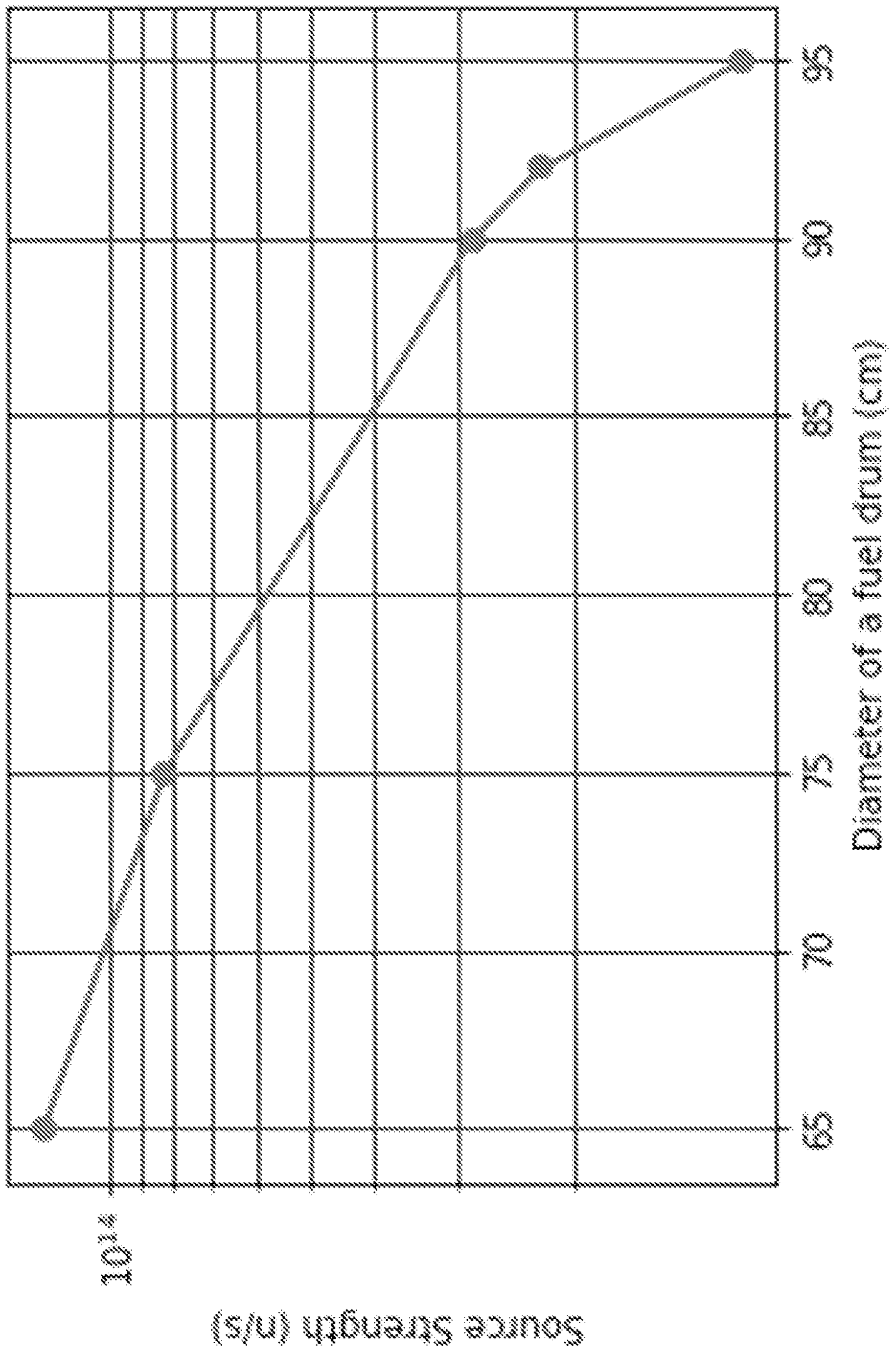
FIG. 16 illustrates a plot of the relationship between the source strength in (n/s) and the diameter of a fuel drum, according to an example implementation of the present disclosure.

For an implementation of the present disclosure with a drum design with 4 annuli of 2 cm thickness each, the fuel height used to achieve a given degree of subcriticality was determined. Additionally, the need for reflector outside the source regions was evaluated. FIG. 15B compares the behavior of $k_{eff}$ with and without reflectors as a function of the core height and indicates that: i) use of reflector has a significant impact on the system eigenvalue (i.e., degree of subcriticality), and, ii) a core height between 73 cm to 74 cm is needed to achieve an effective multiplication factor ($k_{eff}$) value between 0.987 and 0.995 without reflector and between 0.998 and 1.004 with reflector.

Additionally, for the core height of 73 cm, the self-shielding effect of each fuel annulus was examined by reducing the thickness from 2 cm to 1.5 cm and 1.0 cm, and also varying the number of annuli. The table 1, below, compares Monet mass and eigenvalue (i.e., degree of subcriticality) for a few cases.

TABLE 1

Example Monet fuel mass and eigenvalue as a function of number of fuel annuli in each fuel drum

| Number of fuel annuli in each drum | Thickness of each fuel annulus (cm) | Graphite thickness between fuel annuli (cm) | Total Fuel mass* (tons) | Eigenvalue |
|---|---|---|---|---|
| 4 | 2 | 2 | 1.47 | 0.99862 |
| 4 | 1 | 2 | 0.68 | 0.93386 |
| 5 | 1 | 2 | 0.90 | 0.96819 |
| 5 | 1.5 | 1.5 | 1.37 | 0.99138 |

*including all the fuel drums

The table above indicates that a reasonable degree of subcriticality can be achieved in implementations of the present disclosure by varying number and thicknesses of the annuli per fuel drum. Multi-variable the optimization studies can be performed considering key parameters such as the core weight and size, amount of the external source, the operating life, fuel drum rotation frequency, simplicity of reactor control system, feasibility of manufacturing, and the cost to determine an optimal core configuration depending on the mission objectives. For example, for the core designs presented in Table 1, the estimated total mass of the core is between 7 t to 8 t to generate about 10 kW. This mass can be reduced in some implementations by placing the source at regions with high neutron importance, which can be evaluated by determining the importance function associated with the fission neutrons throughout the reactor core. Additionally, in some implementations, it can be more effective if the required power is produced by a combination of smaller of modules that meet the existing weight limitation (i.e., 0.6 t) for placing the reactor on the surface of the moon. For example, for this non-limiting example implementation, 10-12 modules can meet the weight limitation and deliver the required power. This approach can introduce flexibility in the deployment and use of the reactors on the moon. Finally, it is important to note that the maximum power of the Monet design can be adjusted (due to its subcriticality condition) because it is directly related to the amount and arrangement of the external sources used. A machine learning (ML) algorithm can be used to enable adjustment of the rotation frequency of the fuel drums, and the movement of the sources for reactor control during normal and accident conditions.

Monte Carlo calculations were conducted to examine key system parameters such as degree of subcriticality, and the core mass and size.

Figure 17:
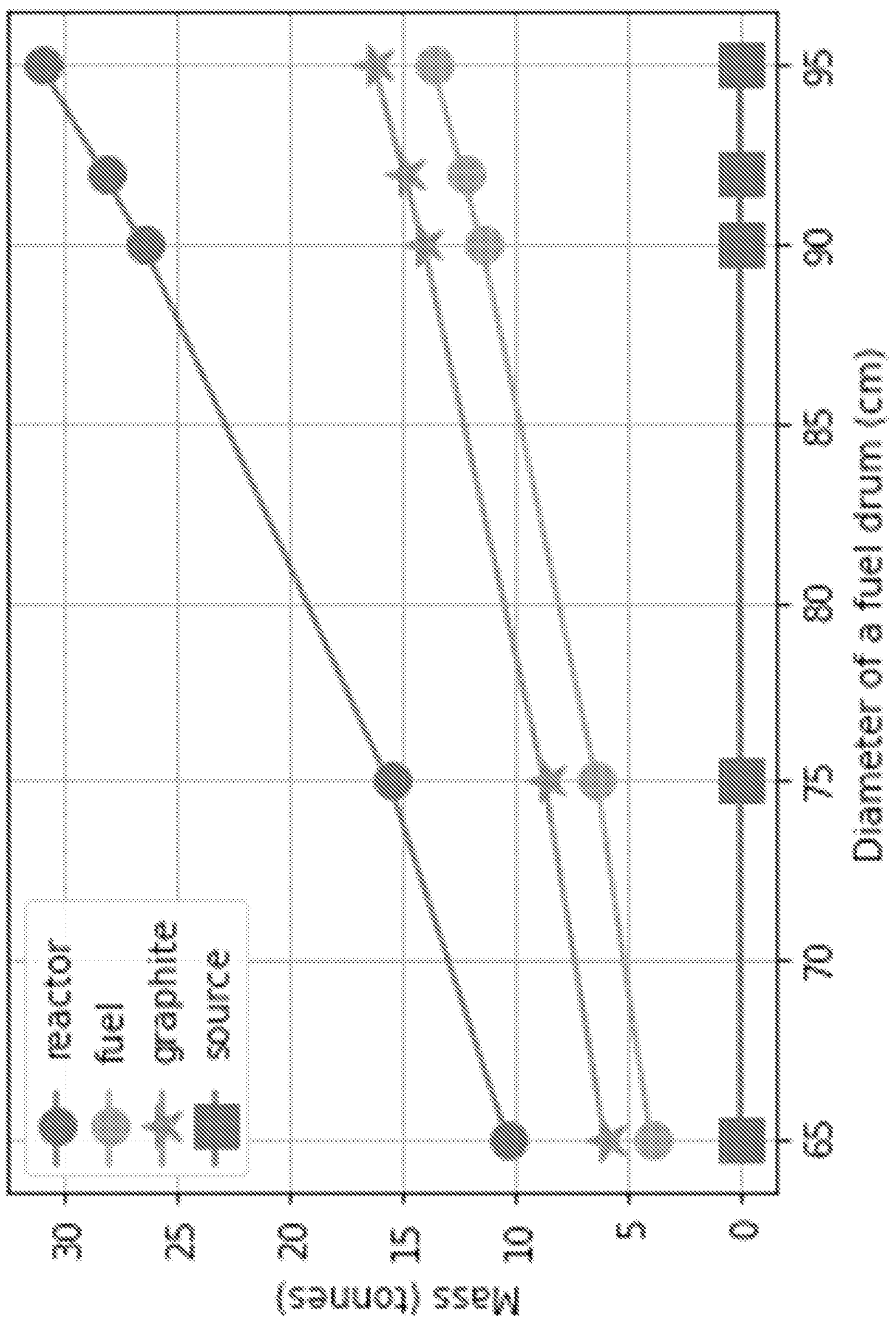
FIG. 17 illustrates the masses of the reactor, fuel, graphite, and source in example implementations of the present disclosure.

Additionally, FIG. 17 illustrates the variation of reactor mass and its major components including fuel, moderator, and source.

The reactor mass increases from about 10 t to 31 t with increasing fuel drum diameter with graphite and fuel representing the major portion of this mass.

The present disclosure contemplates the use of other designs and combinations of fuel, moderator and source. FIG. 14B illustrates an alternative design, according to another implementation of the present disclosure, which uses a larger fuel drum of 100 cm diameter with thinner fuel annuli of thickness of 5 cm, a central source region of radius 15 cm in each fuel drum, and an outer source drum (light green) of thickness 10 cm. This arrangement can result in a somewhat reduced amount of fuel and moderator of 11.7 t and 14.9 t, respectively, and somewhat increased amount of source of 4.5 t. Because of the reduced self-shielding effect, while the amount fuel and moderator decreases, the $k_{eff}$ of the reactor can increase to 0.99745, i.e., about 743 pcm. The amount of source needed, however, can be reduced to about 3.7e12 n/s. It should be understood that the drum diameter, annuli thickness, and other dimensions given herein are intended only as non-limiting examples, and that the designs and design techniques described herein can be applied to reactors of any size.

Our studies to date have demonstrated that maximum reactor power can easily be adjusted by changing the amount of source for the same reactor core design. Additionally, the core neutron economy (i.e., $k_{eff}$ and subcritical multiplication M), fuel burnup, core life, and core weight can be optimized by considering different combinations of fuel, moderator, and source positioning and amount, different enrichments, and different rotation speeds. Alternative implementations of the present disclosure can include a single fuel drum, larger number of drums, different sizes of fuel regions of different enrichments, a single fuel enrichment, and other source placements (e.g., an external source annulus for each drum rather than the one annulus used in some implementations of the present disclosure, and reducing the amount of outside graphite.

To develop optimum designs of some implementations of the present disclosure, a detailed multi-variable study considering the parameters disclosed herein can be performed. Additionally, multiphysics studies can be performed to account for cooling strategies, temperature effects, and corresponding source movement, and an autonomous control system will be developed using machine learning algorithms which can utilize online measurements and computation.

Implementations of the present disclosure can be designed using ordinary manufacturing techniques and reactor fuels. This can increase the manufacturability of implementations of the present disclosure and/or reduce the cost of implementations of the present disclosure.

In some implementations of the present disclosure, a thermionic energy conversion (TEC) method can be used to convert heat to electricity.

Figure 18:
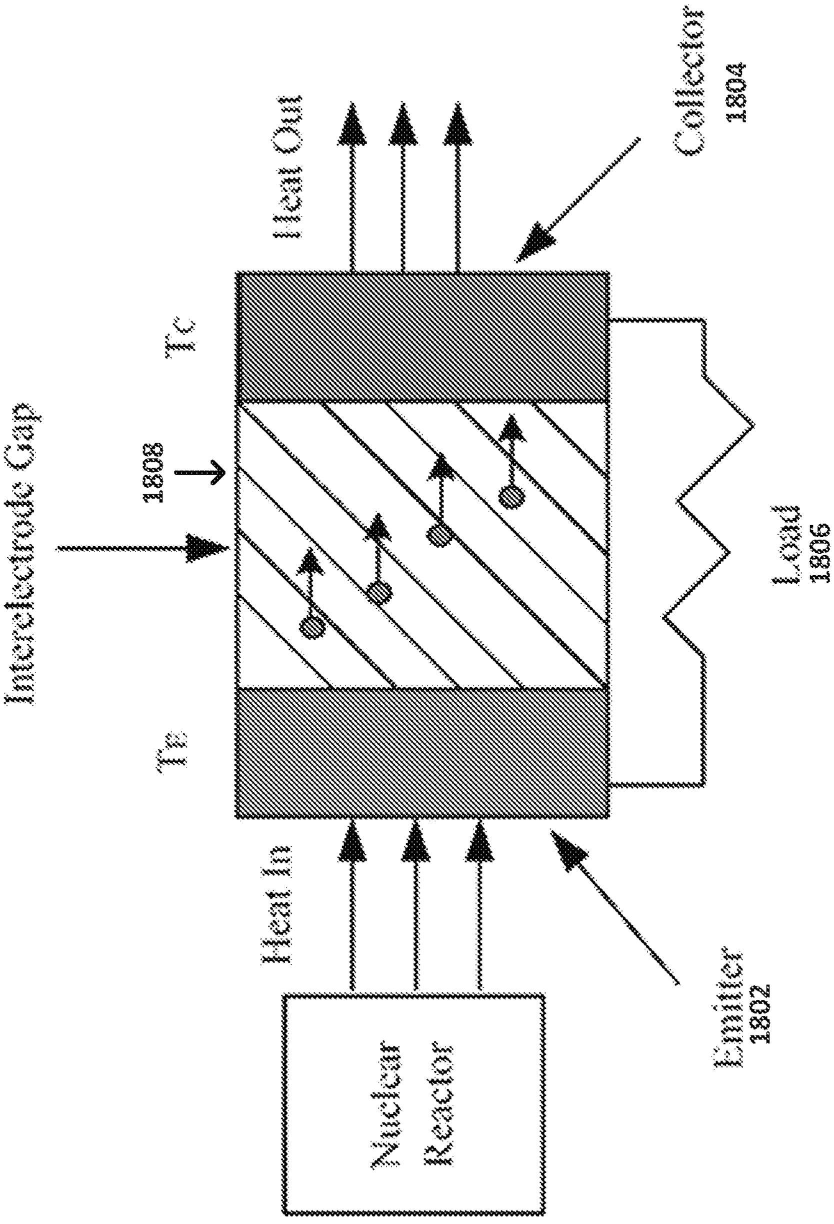
FIG. 18 illustrates a thermionic generator that can be used to generate electrical energy in some implementations of the present disclosure.

Thermionic energy conversion is a direct conversion of heat energy into electrical energy. Therefore implementations of the present disclosure including thermionic energy conversion can perform the energy conversion with few or no moving parts, and increased reliability. FIG. 18 illustrates a non-limiting example of the process. As shown in FIG. 18, a thermionic energy converter includes an emitter electrode 1802, a collector electrode 1804, and a load line 1806. The electrodes 1802 and 1804 are arranged in a vacuum chamber 1808 housing a gas vapor. Thermionic conversion generates current that can be made to flow between two electrodes at different temperatures in a vacuum. This energy conversion system uses the phenomenon of electron transmission when metals are at high temperatures. At a non-zero temperature, when the metal is immersed in rare gas vapor, charged particles, such as electrons, ions, emitted from the metal surface like vapor are called thermion emission. At work, the emitter is heated to a very high temperature. The free electrons on the metal surface get enough energy and leap the electrode clearance, then reach the receiving stage. The electrons work on the load through the outer circuit connected to two electrodes, then return to the emitter, forming an electrical circuit. The interelectrode gap is filled with cesium vapor. The residual heat is discharged through the receiving stage (i.e. Collector in FIG. 18). The overall energy conversion system diagram is given in FIG. 19.

A part of thermal energy generated in the reactor core is directly translated into electricity by thermionic converters, and the leftover portion is removed as waste heat through the coolant system and radiator. Thermo-mechanical parameters, such as electrode temperatures, interelectrode irradiation coefficient, interelectrode gap size, could or might exert significant influence on characteristics of thermionic conversion. To achieve more precise predictions, thermionic conversion and circuits are coupled as shown in FIG. 18. Since the number of emitted electrons is extremely sensitive to temperature, a dramatic increase in current density could be achieved by increasing the emitter temperature and decreasing the heat loss between fuel and emitter. If the interelectrode gap is too large, only a few electrons could travel through the gap to the collector. However, the interelectrode gap also should not be too small, because the life span of a converter is reduced greatly due to mass migration under long-term and high temperature operations. For our Initial design a gap size of 0.3 mm is selected to optimize the gap size in the design phase. Even though the efficiency of the thermionic system is proportional to the emitter temperature, the life span of a converter could be reduced greatly under long-term high temperature operation. Therefore, the emitter temperature should remain below ~2070K. In addition, further increase of emitter temperature results in the need for high fuel temperature, leading to blocking of the interelectrode gap illustrated in FIG. 18). The efficiency of the thermionic system depends on several limitations mentioned in this section. Therefore, temperature distributions for the power conversion system will be optimized by using the proposed energy conversion system.

Space Flight System Integration

Implementation of the present disclosure can be configured as a 'lander agnostic' payload, to the greatest extent possible, to enable delivery and operation across the broadest portfolio of NASA-selected landers within the Commercial Lunar Payload Services (CLPS) program, and to therefore also enable the broadest range of lunar surface applications. This approach is possible, in part, because implementation of the present disclosure can be powered off for launch, flight, and landing, and therefore can be essentially an inert mass for most of the dynamic phases of spaceflight.

Accordingly, implementations of the present disclosure can model the space flight system dimensions against basic mass, center-of-gravity, vibration, and thermal environments in the power-off configuration, thereby placing only minimum reliance (e.g., possible heaters for thermal maintenance) on the launch vehicle, lander, or spacecraft bus during all phases of the mission prior to activation on the lunar surface. This approach can simplify spacecraft/payload interfaces, reduce complexity, facilitate greater modularity in testing and development, and reduce cost.

A non-limiting example of a suitable lander that can include or transport implementations of the present disclosure is the lunar lander sold under the trademark Griffin, designed and built by Astrobotic of Pittsburgh, PA. This lander was selected by NASA to deliver the VIPER (Volatiles Investigating Polar Exploration Rover) rover to the vicinity of the Moon's south pole, in search of water and other volatiles essential for sustained human exploration.

Figure 20:
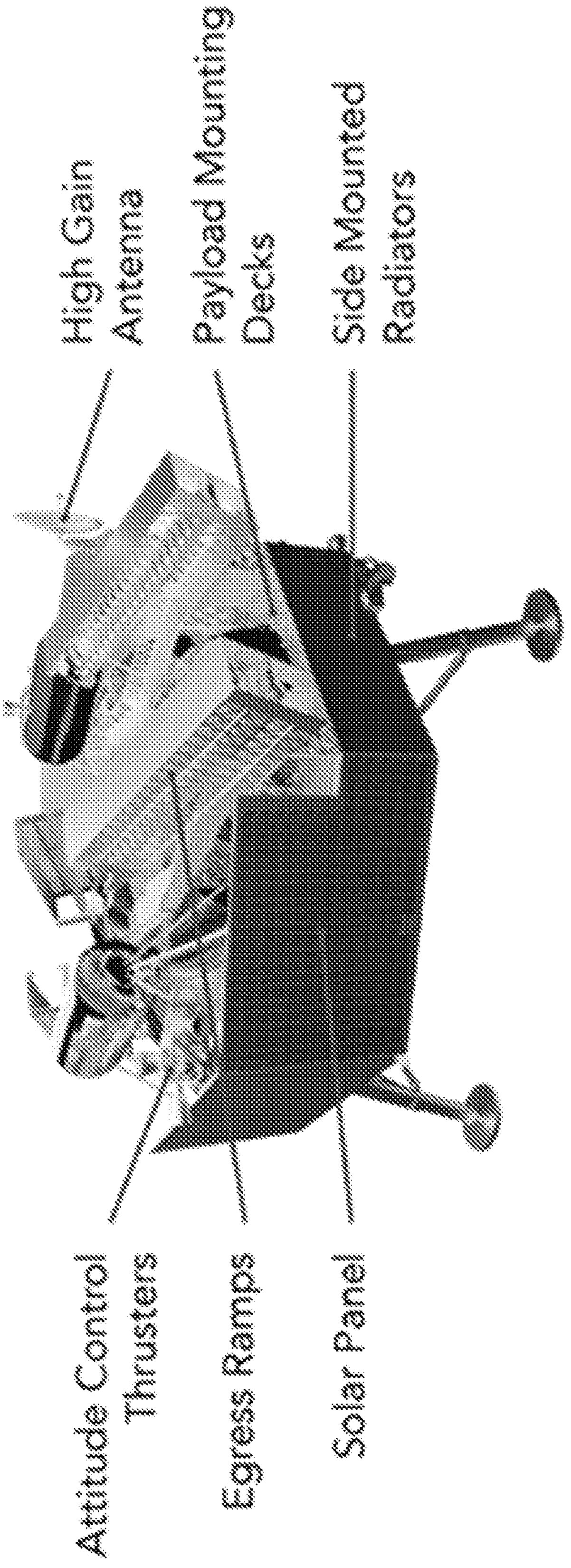
FIG. 20 illustrates an example of a landing vehicle that can be used to transport implementations of the present disclosure.

An example of the Griffin is illustrated in FIG. 20 is anticipated to deliver VIPER to the lunar surface as early as the last calendar quarter of 2023. Additionally, it is compatible with the SpaceX Falcon Heavy launch vehicle, and the ability of this lander to deliver substantial payload mass to equatorial and polar destinations on the lunar surface. In the polar configuration, Griffin can deliver up to 625 kg (1,375 lb). The Griffin lander also offers a highly configurable payload adapter deck to which the implementations of the present disclosure can be attached. As a non-limiting example, implementations of the reactor disclosed herein reactor can be attached as a static, active payload after landing, or both the reactor and generator can be attached as static, active payloads after landing. As described above, some implementations of the present disclosure are modular and can be Additionally, the present disclosure contemplates that one or more parts of the reactor and/or generator can be transported separately and combined in situ. As an example, one lander can transport the reactor, while a second lander can transport the generator. Alternatively, one lander can transport some parts of the reactor and/or generator while other landers can transport other parts of the reactor and/or generator.

Implementations of the present disclosure can be derivative High Temperature Gas Reactors (HGTR). Challenges in the neutronics modeling of HTGRs can include: (1) high burnup and high temperatures expected, (2) dealing with double fuel heterogeneity and spatial power oscillations, and (3) quantification of uncertainties. The MCNP and SERPENT codes will be used to perform burnup calculations for implementation of the present disclosure and to develop a predictive model to optimize the rotation of the cylinders and movement of the sources to achieve uniform burnup over the vertical height, including possible impact of uncertainties.

Thermionic energy conversion (TEC) method can be used to convert heat to electricity. Electrons evaporate from hot cathode (heated by nuclear fuel) into a vacuum and are collected by anode (cooled by helium coolant) to generate electric current. The power generation cycle will be designed and optimized to maximize the generated electricity by using RELAP5-3D/SCDAP. The modified Reactor Excursion and Leak Analysis Program (RELAP5) with the implement of thermionic energy converter properties and heat transfer correlations is adopted to analyze the thermal-hydraulic (TH) characteristics of the space nuclear reactor. The power generation cycle will be designed and optimized to maximize the generated electricity by using RELAP5-3D/SCDAP. A RELAP5 model including the thermionic fuel elements (TFEs), reactor core, radiator, coolant loop and volume accumulator will be established. The temperature reactivity feedback effects of the fuel, TFE emitter, TFE collector, reflector, moderator and the reactivity insertion effects of control drums and safety drums will be considered in the model. The steady state condition will be simulated and analyzed. The maximum temperatures of the fuel and TFE components will be predicted to design the coolant channels of the fuel elements. The size and geometry of the coolant channels, the connections to the rest of the power conversion system will be designed and simulated in this task.

In some implementations of the present disclosure, strong feedback effects between TH and neutronics can be expected for small size HTGRs. Therefore, the transient behavior of an implementation of the present disclosure can be modeled by advanced coupled tools, such as RELAP/SCDAP and NESTLE, to capture the feedback effects of thermal-hydraulics, reactor kinetics, and fuel behavior. The coupling of codes models not only TH and neutronics of the fuel elements but also structural components of the power conversion system. Furthermore, the neutronic component is not limited to the sole core solver. The coupled code system encompasses TH material performance of the fuel, neutronic solver, and neutronic data preparation. This can provide a framework for coupling RELAP5/SCDAPSIM/MOD4.0 with a suite of neutron kinetics codes that includes NESTLE, DRAGON and/or a version of the ENDF library. This task will use nodal power distributions to calculate mechanical and thermal parameters such as heat-up, and meltdown of fuel rods and control rods, the release of fission products from fuel rods, and the disintegration of fuel rods into porous debris. On the neutronics side, this work will use the NESTLE and DRAGON codes. NESTLE solves up to four energy groups neutron diffusion equations utilizing the Nodal Expansion Method (NEM). The DRAGON code, developed at Ecole Polytechnique de Montreal, performs lattice physics calculations based on the neutron transport equation and is capable of using very fine energy group structures. In this work, the coupling approach to exchange data among the various modules will be used. In the coupling process, the generated nuclear data (in fine multigroup energy structure) will be collapsed down into two- or four-group energy structures for use in NESTLE. The power distribution results of the neutronic calculations will be transmitted to the thermal-hydraulics code. The spatial distribution of coolant density and the fuel-moderator temperature, which result from the TH calculations, will be transmitted back to the neutron kinetics codes and then the loop is closed using new neutronics results.

Material aspects of some implementations of the present disclosure can be similar to a HTGR and therefore design methods can rely on the knowledge developed under the U.S. Department of Energy (DOE) activities to qualify TRISO fuel particle, graphite and other structural components. Analysis can be conducted to ensure that implementations of the present disclosure conditions fit into the irradiation conditions on the moon. This can include verifying that the existing data are sufficient to ensure integrity of materials component under operating conditions suitable for autonomous control, online monitoring of components for maintenance and accident conditions, specifically focusing on reactivity insertions and decay heat removal.

The design basis accidents and operational transients with disruptive consequences can be evaluated using the RELAP5-3D and MELCOR codes. A RELAP5 model including the thermionic fuel elements (TFEs), reactor core, radiator, coolant loop and volume accumulator can be established. The temperature reactivity feedback effects of the fuel, TFE emitter, TFE collector, reflector, moderator and the reactivity insertion effects of control drums and safety drums will be considered in the model. Three severe transient accidents including reactivity insertion accident (RIA), loss of flow accident (LOFA) and loss of coolant accident (LOCA), will be simulated and analyzed. Test matrix can be prepared based on the wide range of boundary conditions will be used to run RELAP5. All these transients can define which transients and special boundary conditions can be considered as the limiting design basis accident(s). The maximum temperatures of the fuel and TFE components will be compared against the melting temperature of the components. In addition, the time for operator's response for the progress of these accidents can be predicted with the simulators to show that the calculation results prove that the reactor is a safe and reliable system or not.

Safety assessment can be supported using a dynamic probabilistic safety assessment (DPSA) approach. DPSA allows a unified framework to account for the joint effects of aleatory and epistemic uncertainties in predicting the distribution of risk associated with the system response and is particularly appropriate for systems with passive features as with the proposed concept due to the possible interaction of process, hardware and software in a compact design. The inputs for DPSA can be: #1: a time-dependent system model (which can be based on the system models described herein); #2: possible normal and abnormal system configurations (which can be based on the system configurations described herein), and, #3: transition probabilities (or rates) among the chosen configurations.

Additionally, the present disclosure contemplates that multiple phases of risk assessment can be performed. For example, the first phase can correspond to the launch phase where the reactor can be inert within the confines of the spacecraft. This can present a relatively low risk but can lead to damage of the reactor core. The second phase can correspond to the phase during which the reactor core is moved out of the spacecraft using the lander and deposited on the moon surface. Here again the risk can be limited to damaging the core. The third phase can correspond to the reactor installation phase. The final phase can correspond to reactor operation. It should be understood that these phases are intended only as examples, and that the safety of implementations of the present disclosure can be modeled using any number of phases where the phases include different activities from those described herein.

Common cause failures can be modeled as a separate system configuration or using other techniques (e.g., beta factor method) depending on data availability. Non-limiting examples of tools that are suitable for performing this analysis include DPSA tools ADAPT and RAVEN which can be coupled to the neutronic and TH codes used in the design process to identify and quantify the likelihood of possible risk modes. Determining data for transition probabilities can be a challenging input to the risk assessment since data can be scarce (if at all available) for hardware behavior under lunar conditions. If data are not available to quantify such behavior, then DPRA results on combination of system component failure modes that lead to undesirable consequences for the mission can be used to identify data needs for quantification. In addition, expert opinion elicitation in combination with Bayesian analysis can also be performed to obtain relevant estimates. The safety analysis can be performed iteratively based on experimental data. Additionally, modifiers can be used in the safety analysis to approximate the conditions of different environments (e.g., the moon's surface, outer space, etc.).

The construction models of reactor chambers can be designed to reduce capital cost, while meeting U. S. Nuclear Regulatory Commission requirements for safety. Moreover, the design of implementations of the present disclosure can take into account the types of forces that are likely to be encountered where the reactor is deployed. For example, isolation systems can be designed in ANSYS/ABAQUS platforms to reduce potential seismic effects from moonquakes—caused by lunar tides and meteoroid impacts—on safety-critical components and to achieve a nearly uniform design independent of characteristics of sites. A modularized design will allow shorter construction times to reduce financial exposure and schedule risk, primary reasons for nuclear terrestrial power plant high capital costs. The high degree of factory manufacturing and assembly will result in less total need for construction support resources for project management and quality assurance and control.

The mass and dimensions of implementations of the present disclosure can make it ideal for launch either in multiples within a dedicated launch vehicle, or as a secondary payload on any launch to Trans-Lunar Injection. Therefore, these implementations can be suitable as a dedicated, single, and modular payload aboard a robotic lander base, such as the small/medium Lander Designs pursued by NASA/Marshall Space Flight Center and the Johns Hopkins Laboratory in 2010. This can include configuring the implementations of the present disclosure so that they meet mass limits, volume constraints, launch and other acceleration loads, thermal environments that include cruise-phase and surface operations, telemetry, and power distribution. This design process can include several design and analysis iteration cycles.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A nuclear reactor core comprising:

a neutron moderator;

a plurality of cylindrical fuel modules positioned within the neutron moderator, wherein each of the plurality of fuel modules comprises:

a cylindrical body having opposing flat end surfaces and a curvilinear surface between the flat end surfaces;

nuclear fuel arranged in one or more fuel strips formed in the curvilinear surface of the cylindrical body; and at least one coolant channel extending between the flat end surfaces and configured to allow a coolant to flow through the cylindrical body;

at least one fuel-module actuator mechanically coupled to at least one of the plurality of fuel modules, wherein the at least one fuel-module actuator is configured to rotate the at least one of the plurality of fuel modules about an axis of the cylindrical body; and at least one neutron source that is distinct from the plurality of fuel modules, wherein:

the at least one neutron source is positioned within the neutron moderator on a track or rail formed in the neutron moderator; and the at least one neutron source is configured to emit neutrons to trigger and sustain a fission chain reaction in the nuclear fuel, wherein the fission chain reaction is maintained in a subcritical condition.

2. The nuclear reactor core of claim 1, further comprising at least one source actuator mechanically coupled to the at least one neutron source, wherein the at least one source actuator is configured to reposition the at least one neutron source.

3. The nuclear reactor core of claim 1, further comprising a plurality of source actuators, wherein the at least one neutron source is a plurality of neutron sources and wherein each of the plurality of source actuators is mechanically coupled to a respective one of the plurality of neutron sources, and wherein each of the plurality of source actuators is configured to reposition the respective one of the plurality of neutron sources.

4. The nuclear reactor core of claim 1, wherein the at least one neutron source comprises Americium (Am)-beryllium (Be), plutonium (Pu)—Be, or radium (Ra)—Be.

5. The nuclear reactor core of claim 1, wherein each of the plurality of cylindrical fuel modules defines an axial direction, and the nuclear fuel is arranged in at least one axial slice formed in at least one of the plurality of cylindrical fuel modules.

6. The nuclear reactor core of claim 1, wherein each of the plurality of cylindrical fuel modules has a three-dimensional shape that defines a radial direction, and the nuclear fuel is arranged in at least one radial slice formed in at least one of the plurality of cylindrical fuel modules.

7. The nuclear reactor core of claim 1, wherein the nuclear fuel is high enriched uranium or low enriched uranium.

8. The nuclear reactor core of claim 1, wherein the at least one neutron source is configured to move relative to the neutron moderator.

9. A nuclear reactor comprising the nuclear reactor core of claim 1 and a vessel, wherein the plurality of fuel modules of the nuclear reactor core are housed in the vessel.

10. The nuclear reactor of claim 9, wherein the at least one neutron source is housed in the vessel.

11. A system comprising:

the nuclear reactor core according to claim 1; and a controller comprising a processor operably coupled to a memory, the memory having computer-executable instructions stored thereon that, when executed by the processor, cause the processor to control the at least one fuel-module actuator and/or the at least one neutron source to control a rate of the fission chain reaction in the at least one of the plurality of cylindrical fuel modules.

12. A system comprising:

the nuclear reactor core according to claim 1; and an energy conversion system thermally coupled to the nuclear reactor core.

13. The system of claim 12, wherein the energy conversion system comprises an thermionic energy converter, the thermionic energy converter comprising:

an emitter electrode;

a collector electrode; and a load line coupling the emitter and collector electrodes, wherein the emitter electrode is thermally coupled to the at least one of the plurality of cylindrical fuel modules.

* * * * *